(12) United States Patent
Dupey et al.

(10) Patent No.: US 10,540,380 B2
(45) Date of Patent: Jan. 21, 2020

(54) KEYSTROKE SEARCH AND CLEANSE OF DATA

(71) Applicant: SAP SE, Walldorf (DE)

(72) Inventors: Ronald Dupey, Onalaska, WI (US);
Steve Ellison, La Crosse, WI (US);
Pete McDonald, Onalaska, WI (US);
Gerard Winkler, Onalaska, WI (US);
Randy Simonson, Trempealeau, WI (US)

(73) Assignee: SAP SE, Walldorf (DE)

( * ) Notice: Subject to any disclaimer, the term of this patent is extended or adjusted under 35 U.S.C. 154(b) by 463 days.

(21) Appl. No.: 15/381,808

(22) Filed: Dec. 16, 2016

(65) Prior Publication Data
US 2018/0173798 A1     Jun. 21, 2018

(51) Int. Cl.
*G06F 16/335*     (2019.01)

(52) U.S. Cl.
CPC .................................. *G06F 16/335* (2019.01)

(58) Field of Classification Search
CPC .. G06F 16/335; G06F 16/951; G06F 16/9535; G06F 16/24575; G06F 16/9558; G06F 16/00; G06F 16/248; G06F 16/957; G06F 16/22; G06F 16/242; G06F 16/2455; G06F 16/3322; G06F 16/332; G06F 16/3331; G06F 16/334; G06F 16/338; G06F 16/58; G06F 16/5846; G06F 16/90324; G06F 16/90328; G06F 16/94; G06F 16/955; G06F 16/9566; Y10S 707/99934; Y10S 707/99935
USPC ....................................................... 707/706
See application file for complete search history.

(56) References Cited

U.S. PATENT DOCUMENTS

| 7,912,842 B1 * | 3/2011 | Bayliss | G06F 16/2471 |
| | | | 707/749 |
| 2002/0153409 A1 * | 10/2002 | Yu | G06F 16/252 |
| | | | 235/375 |
| 2003/0225725 A1 * | 12/2003 | Miller | G09B 29/106 |
| 2009/0112916 A1 * | 4/2009 | Stuhec | G06F 17/2247 |
| 2009/0248669 A1 * | 10/2009 | Shetti | G06F 16/3322 |

* cited by examiner

*Primary Examiner* — Evan Aspinwall
(74) *Attorney, Agent, or Firm* — Mintz Levin Cohn Ferris Glovsky and Popeo, P.C.

(57) ABSTRACT

A cleanse engine receives address data from an application as the address data is entered into the application. The cleanse engine parses the address data as the data is received from the application. The cleanse engine performs a final address validation to validate a final address when sufficient parsed address data is available and returns the final address to the application. The cleanse engine sends the parsed address data to a search engine when insufficient parsed address data is available to perform the final address validation. When the parsed address data is sent to the search engine, the search engine queries reference data and returns a list of search results to the cleanse engine. The cleanse engine standardizes the list of search results from the search engine and sends the list of search results to the application.

15 Claims, 63 Drawing Sheets

Street Address
620 N Lake Shore Dr

Apt. Number, Suite, etc. (optional)
Ste 201

City
Chicago

State
Illinois

ZIP Code
60611-4635

Cancel | Save

| Address 1: | International House |
| Address 2: | 16 Studdery St |
| Address 3: | |
| Locality: | |
| Town: | London |
| Postcode: | WC2B 5QL |

Address: 1120 Emerald St
City: Madison
Region: WI
Postcode: 53715-0692

FIG. 5A

| Address: | 526 S Cherry Rd |
| City: | Rock Hill |
| Region: | SC |
| Postcode: | 29732-4409 |

| Address1: | Hatfield House |
| Address2: | 13 Danbury St |
| Address3: | |
| Locality: | |
| Town: | London |
| Postcode: | N1 8LD |

FIG. 51

KEYSTROKE SEARCH AND CLEANSE OF DATA

TECHNICAL FIELD

This description relates to performing a keystroke search and cleanse of data.

BACKGROUND

Data quality functions may be performed using an on-premise solution and/or a cloud-based solution. Current systems and processes for performing data quality functions may be cumbersome for users to use due to the need to define and store a configuration for each data quality scenario. Also, current systems and processes may not be integrated with other systems and processes such as search-related systems and processes.

SUMMARY

According to one general aspect, a cleanse engine receives address data from an application as the address data is entered into the application. The cleanse engine parses the address data as the data is received from the application. The cleanse engine performs a final address validation to validate a final address when sufficient parsed address data is available and returns the final address to the application. The cleanse engine sends the parsed address data to a search engine when insufficient parsed address data is available to perform the final address validation. When the parsed address data is sent to the search engine, the search engine queries reference data and returns a list of search results to the cleanse engine. The cleanse engine standardizes the list of search results from the search engine and sends the list of search results to the application.

In one or more implementations, the list of search results sent to the application may include display data for displaying by the application and non-display data. The cleanse engine receives a selection from the list of search results from the application including the non-display data associated with the selection. The cleanse engine performs the final address validation on the non-display data associated with the selection and returns the final address to the application.

In another general aspect, a cleanse engine receives address data from an application and parses the address data into a list of tokens. The cleanse engine performs a final address validation to validate a final address when sufficient parsed address data is available and returns the final address to the application. The cleanse engine sends the list of tokens including one or more ranked parses with the components tokenized within each parse to a search engine when insufficient parsed address data is available to perform the final address validation. When the parsed address data is sent to the search engine, the search engine queries reference data using tokens from a parse and returns a list of search results to the cleanse engine. The cleanse engine standardizes the list of search results from the search engine sends the list of search results to the application.

The above general aspects and example implementations may be implemented as system, a computer-implemented method and a computer program product.

The details of one or more implementations are set forth in the accompanying drawings and the description below.

Other features will be apparent from the description and drawings, and from the claims.

BRIEF DESCRIPTION OF THE DRAWINGS

FIGS. 3A-3Z, 4A-4Z, and 5A-5I relate example user interfaces.

DETAILED DESCRIPTION

Figure 1:
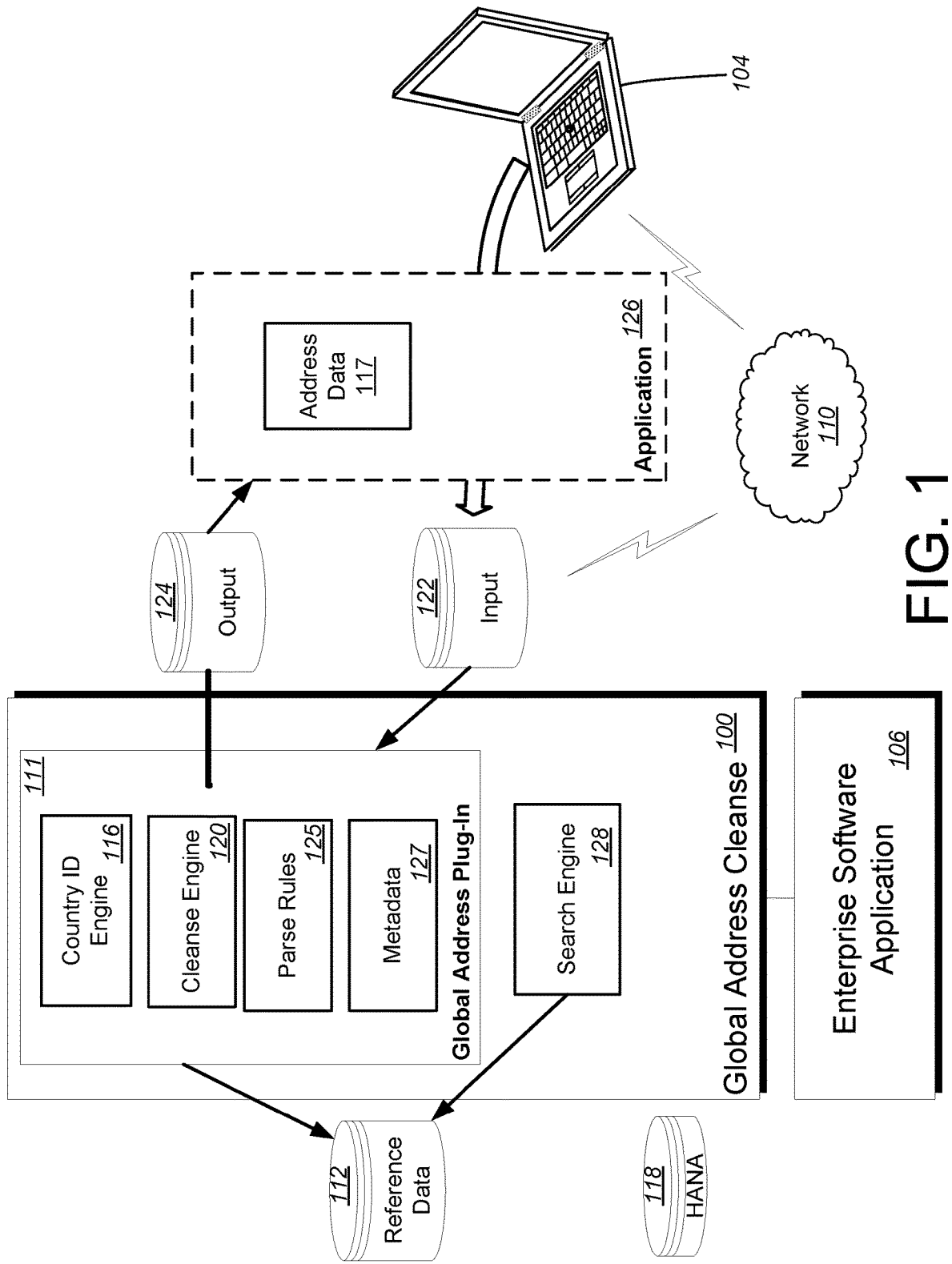
FIG. 1 is a block diagram of an example system for performing data quality functions using annotations in a cloud computing environment.

This document describes systems and techniques for performing a combined keystroke search and cleanse on received data. More specifically, in one example non-limiting context, this document describes systems and techniques for performing a combined keystroke search and address cleanse on received address-related data. For example, an application sends data to a global address cleanse system that can perform combined keystroke search and cleanse on the data. The global address cleanse system receives the data from the application. The global address cleanse system parses the data and determines what action to take on the data, where the data includes one or more keystrokes. If enough received data exists to validate the address, then the global address cleanse system performs final address validation. If the received data is too incomplete, the global address cleanse system sends the parsed components to the keystroke search engine with one or more ranked parses. The keystroke search engine queries reference data and returns an intelligent result set of either partial address or full address candidates. The global address cleanse system performs standardization on the returned address candidates and returns them to the application with attributes that indicate to the application what to display back to the end user. The end user may select from the candidate list or continue typing. The process is iterative as characters are typed by the user into the application and sent by the application to the global address cleanse system.

The global address cleanse system provides multiple technical advantages. For example, one advantage is that the global address cleanse system can automatically switch between search mode and cleanse mode. In this manner, the consuming application does not have to develop logic to determine when an address is complete enough to send to cleanse, and when it is too incomplete and needs to send to search. The application can send the request to the combined solution, and the solution has the intelligence to make the decision whether the input is partial or complete enough.

For example, when a user is typing an address that has a common street name, such as "100 Main St", even after typing the full street address it is still not a complete address, because there are many cities that have this valid address. Therefore, when the user begins typing the city name the solution still needs to use the search module. However, when the user is typing an address that has a unique street name that only exists in one city, even though they are not yet finished typing the street address, the combined solution of search and cleanse uses the search module with each keystroke up until enough of the unique street name is determined. At this point, the combined solution automatically switches to cleanse mode and finalizes the address, automatically populating not only the street address, but also the city, region, and postcode.

Another advantage is the global address cleanse system enables multiple-field searching. Current search technologies include a single text field where the user types the full address. However, combining search and cleanse allows the search to work from a multiple-field form. The candidates that result from the search are based on the combination of data in the current field and data that has already been entered in other fields.

For example, consider the case where the user begins entering data in the City field, and nothing is yet entered in the Address, Region, or Postcode fields. As the user types each character of "St. Paul", the candidate list gets smaller and smaller until at some point the list switches from showing only cities to showing "current+next" which in this case is city and region. At that point, the user selects "St. Paul Minn." and the city and region fields are populated. If the user makes the Postcode field current by either tabbing into it or inserting the cursor into it, without typing anything, the list of valid zip codes for St. Paul can appear for the user to select from.

Another example illustrating multiple-field searching is when the user begins entering data in the free-form Address field. Because the current field is Address, when the user types "8-7-5-N-", and so on, the solution can have the knowledge that the number is a house number or some component in the street address, and not a postcode. This allows the search to be limited to querying only what is likely to be the intended address components. When the search includes a single field, when the user types a number there is no context to know whether it is the house number, the postcode, or some other numeric component in an address.

Another advantage for the global address cleanse system with combined search and cleanse solution is utilizing parsed results when searching. Combining search and cleanse also offers the benefit of using the results of the parsing step of the cleanse engine to refine the search to be more efficient and accurate. Consider a form with fields for Address, City, Region, and Postcode. If the user begins entering data in the discrete fields of City, Region, or Postcode there is usually no parsing needed and the solution knows exactly what to search in the reference data. However, when the user enters data in the Address field, there are multiple components that make up the street address, and therefore there are many possible components to search in the reference data. Even a simple street address can have a house number, street name, street type, and street prefix or suffix. Added to this is the complexity that in different countries the order of these components is different. Combining search and cleanse allows for the cleanse engine to use its cleansing dictionaries and rules to first parse data so that the search queries can refine their search to only what is appropriate.

With the first characters typed this does not make much of a difference. But as the user types enough characters in "8-7-5-N-M-i-c-h" it can begin to make probability decisions that words like "North" are prefixes or suffixes, words like "Ave" are street types, and so on. Using the parsed results when searching results in more accurate and efficient searches.

Consider the example in which the user enters "10-20" in the Address field. To search on this partial data the results displayed back to the user would probably be unexpected, and give the impression that the business owner of the website is not reputable. However, with the solution that combines search and cleanse the solution is able to parse the data before sending it to search, and therefore the search results can be much more appropriate. In this case, parsing data before searching would identify the probability that for countries such as Canada and Australia the "10" is the unit number and the "20" is the house number, in countries such as France the combined "10-20" is a ranged house number, and in countries such as Brazil the "10" is the broadest sector of a grid city and the "20" the next level.

Another advantage of the global address cleanse system having a combined search and cleanse is the country appropriate standardization of candidates. Combining search and cleanse offers the benefit of displaying candidates to the user with address data standardized to the norms of the country. Basic standardization includes ordering components in the right order. Some examples of varying order include the following:

For the United States the normal order is house number+street name+street type;

For France the normal order is house number+street type+street name;

For Brazil the normal order is street type+street name+house number; and

For Germany the normal order is street name+street type (attached)+house number.

Basic standardization also includes correctly casing address components according to country-specific norms.

Another further advantage of the global address cleanse system having combined search and cleanse is the availability of metadata that may be used in various manners including to provide feedback to the user. Combining search and cleanse offers the benefit of the solution issuing messages that give the user insight into errors. Consider the scenario in which the user is typing an address and the list of candidates displayed with each keystroke does not include the address that the user intends, so the user continues manually typing the full address, and at the end there are no candidates returned. The user has no idea what is wrong. However, when combining search and cleanse, the cleanse module has the capability of identifying what it is about the address that is wrong.

For example, say in a particular city the street "State St" spans house numbers 100-499, but the user types the address "600 State St". At the point that the solution knows the location of the address, the search engine no longer returns candidates. However, the combination of cleanse and search allows the combined solution to utilize the message infrastructure of the cleanse engine to return an appropriate message to the application. In this way, the application can display the message that in this case says that the house number does not fall within the valid range of house numbers on that street. The user is then not confused as to why candidates are no longer being returned. In many situations, this error notification can be displayed to the user before they finish typing the address, resulting in a more efficient process for the user.

Whenever an error scenario like this occurs, the cleanse engine is able to return cleansed, standardized data for all components that match reference data. In the example of the out-of-range house number, the cleanse engine returns the street name, city, and region in its standardized format, and includes the invalid house number, but also provides the error message indicating that the house number is out of range for the street.

Still another advantage of the global address cleanse system is the ability to supplement with suggestion lists. When search is combined with cleanse, the cleanse engine can serve as a router to intelligently identify the best action to take. There are several actions that can happen depending on the amount of data and the uniqueness of data that is sent to the solution.

For example, sometimes the cleanse engine can make a full address match, and therefore the user can select the finalized address without typing more. For example, in the United Kingdom it is common to be able to assign a full address after typing just the postcode. Sometimes the cleanse engine must call the search module to query possible candidates. This occurs when the data is too incomplete or any time there is ambiguity. Sometimes the address is at a state of being a valid deliverable address, but there is finer data available such as a unit number, a building name, or an organization name. This occurs when there are multiple internal units that share the same external address. Combining search and cleanse allows for the cleanse engine to possess the intelligence to make decisions based on parsed data as to which module would provide the user the most accurate information.

FIG. 1 is an example block diagram of a global address cleanse system 100 for performing cleanse and search of address data. The global address cleanse system includes the advantages such a system provides, as described above, and as further described below. The global address cleanse system 100 interacts with a source 104 over a network 110. The global address cleanse system 100 may run on a server such as a cloud computing server or an on-premise server. The source 104 may be one or more computing devices (e.g., client computing devices) providing any number of user interfaces associated with software executing at the client device. The source 104 may be any type of one or more computing devices including, but not limited to, a laptop, a desktop, a server (e.g., a web server and/or an application server), a smartphone, a tablet, or any combinations thereof.

The source 104 includes an application 126, which is a consuming software application that enables the source 104 to send address data to the global address cleanse system 100. The source 104 may represent a web server that receives data input from other computing devices. For example, the source 104 as a web server or application server may receive input from another computing device as a user enters data into a form on a website. The data input into the source 104 may then be communicated by the source 104 as part of address data 117 to the global address cleanse system 100, where the global address cleanse system 100 can perform cleanse and search on the received address data 117. While this document describes scenarios and examples of cleansing and searching on the received address data 117, it is understood that the global address cleanse system 100 may be implemented to cleanse and search any type of data and not just address data.

The global address cleanse system 100 hosts the cleanse engine 120 and the search engine 128. In some implementations, the global address cleanse system 100 may be implemented as part of or on top of a Hana Cloud Platform (HCP) from SAP SE and include a HANA database 118. The HANA database 118 may provide a platform for the cleanse and search functions in cooperation with enterprise software application 106.

The global address cleanse system 100 includes a global address plug-in 111, which includes a country ID engine 116, the cleanse engine 120, a parse rules 125 and metadata 127. The cleanse engine 120 can validate name and address data based on reference data sources, such as reference data 112, and can also format name and address data according to which country or countries correspond to the name or address data. The reference data 112 may include known reference information from sources such as, for example, various postal offices from various countries around the world.

The general flow is as follows. The application 126 sends address data 117 as input 122 to the global address cleanse system 100. The application 126 sends the following to the address cleanse engine 120: the schema of fields exposed to the user, each mapped to the cleanse engine, the country of the address, address data 117 entered by the user so far, and identification of the current field.

The cleanse engine 120 parses the data into a list of tokens, and when possible performs final address validation. When the address is too incomplete for validation, the cleanse engine 120 sends the following to the search engine 128, which also may be referred to as a keystroke search module or keystroke search engine: the country, one or more ranked parses with the components tokenized within each parse and identification of the current token. The search engine 128 queries reference data 112 using tokens in the first parse, if minimal records are returned then queries using tokens in the second parse, and so on. The search engine 128 returns to the cleanse engine 120 one of the following lists depending on the count of records in the result list and on the uniqueness of values returned:

List of search results for the current field;

List of search results for the current field+next (next is data at a broader level)

List of full addresses

The queries use either "equals" or "begins with" depending on the current token and on whether there is a current token stop. The results of the search are grouped so that multiple results with the same significant data appear only once. Also, the condensed list of records are ordered by the count of original records are represented by the single record. This allows for the top records to be the most probable for the user, statistically speaking. Queries allow for some fault tolerance for fuzzy matching, for example missing or extra spaces, missing or extra punctuation, with or without diacritical characters, case-insensitivity, and a non-exact match after a certain number of characters have been entered.

The cleanse engine 120 orders address components in the result according to country specific norms, does some basic standardization of the data, and returns the search results as output 124 to the application 126, along with a search status code. Each record in the search results contains the candidate to be displayed back to the user, and data in the same list of input fields that is not intended to be displayed to the user but may be used by the application 126 depending on the user's interaction with the search results.

The application 126 displays the search results to the user as a list of candidates with the current field. The user may select one of the candidates or may continue typing. If the user selects a candidate, the application 126 looks to the search status code to see if it either populates a subset of fields with non-display data and waits for what the user does next, or sends the non-display data back to the cleanse engine 120 in order to return the finalized address data.

If the user continues typing, the process continues until the search status code indicates that the address is finalized.

In one implementation, the search engine 128 may work most efficiently when the country of the address is provided because certain assumptions may be made based on the country sent in order to optimize the search process and the candidates returned. The following are some examples of assumptions made based on knowing the country. The country ID engine 116 may facilitate looking up the country and providing that information to the search engine 128 by designating or marking the received address data such that country-specific reference data 128 is utilized. When the country is United States it is assumed that the order of components in a street address are sent with the house number before the street data, and that sending a building name is rare. When the country is United Kingdom it is assumed that sending a building name is common and that it is typically sent before the street data, and that it is common to not send a house number at all. When the country is Brazil it is assumed that sending building names is common and they are typically sent before the street data, that the order of components in a street address are sent with the street data before the house number, and that it is common to omit the street type.

When the user begins typing in the street address portion of the address, not yet indicating the city or postcode, it is assumed that the candidates returned do not include the user's intended address. The purpose for returning candidates is to show the user that something is happening even with the first keystroke.

For the first and second typed characters, a single parse is sent to the search engine 128. This parse is very simplistic—If the characters are numeric the token is assumed to be house number, and when they are alphabetic the token is assumed to be street name. Intelligent parsing does not begin until the third typed character.

When the initial characters are numeric, the search engine 128 does an "equals" search for the house number.

The search engine 128 initially assumes that the user is entering the correct house number when sending a street address. However, because typos can occur there is an action specifically designed for an incorrect house number, which is explained below in one of the scenarios.

Due to the nature of address data, it is common for words to have multiple possible properties. As a result, the address cleanse engine 120 commonly identifies multiple possible parses for partial address data, ranking the parses in order of probability. The search engine 128 first queries with the first ranked parse, and only when the number of matches is minimal does it query with the second ranked parse, then the third, and so on. It is assumed that with partial address data the search engine 128 rarely queries using any parses but the first. Following are some examples in which individual words can have multiple parses:

"3" can be a house number such as "3 Main St" or part of the street name such as "100 3rd Ave";

"St" can be an abbreviation for the street type such as "100 Main St" or part of a street name such as "100 St. Francis Rd";

"North" can be a prefix or suffix to a street such as "100 Main St N", or it can be part of the street name such as "100 North Shore Dr", or it can be the full street name such as "100 North Ave"; and "Prospect" can be part of the building name such as "Prospect House", or it can be part of a street name such as "100 Prospect Ave".

Below are discussed the input/output attributes that may be sent between the various components. The following are two lists of attributes. The application 126 may send attributes in one of these lists to the address cleanse engine 120:

| mixed * | street * |
| mixed2 | house_num |
| mixed3 | house_num2 |
| mixed4 | floor |
| mixed5 | roomnumber |
| mixed6 | building |
| mixed7 | str_suppl |
| mixed8 | str_suppl2 |
| mixed9 | str_suppl3 |
| locality * | location |
| locality2 | locality * |
| locality3 | locality2 |
| region | locality3 |
| region2 | region |
| postcode * | postcode * |
| country * | country * |
| current_field * | po_box (*) |
| | po_box_locality |
| | po_box_region |
| | po_box_postcode |
| | po_box_country |
| | current_field * |

Attributes with asterisks may be desirable to provide to make the system work efficiently. The one with parentheses around the asterisk is required only when there is a postbox address. The current_field attribute identifies which field in the application contains the cursor.

The following is a list of attributes that the address cleanse engine 120 may send to the search engine 128.

country
addr_search

The addr_search attribute may consist of any of the following attributes:

address.street.primary.name.streetName
address.street.primary.name.streetType
address.street.primary.name.streetPrefix
address.street.primary.name.streetSuffix
address.street.primary.number.houseNumber
address.street.primary2.name.streetName
address.street.primary2.name.streetType
address.street.building
address.cityRegionPostcode.city
address.cityRegionPostcode.region
address.cityRegionPostcode.postcode
current_token
current_token_stop The attributes with the "address" prefix contain the parsed address data to use in the search query.

The current_token attribute identifies which of the "address" attributes has the location of the last action by the user. Usually this represents the attribute that contains the last keystroke entered by the user, but in some cases may represent the attribute for a discrete field that does not yet have any data.

The current_token_stop attribute identifies that it is probable that the intent of the user is to stop typing one attribute and will subsequently begin typing another attribute in the same field. Common keystrokes that trigger this attribute include a space, period, or comma. When this attribute is included, the search engine 128 queries with "equals" instead of "begins with", and falls back to "begins with" only when no records match.

The following is a list of attributes that the search engine 128 may return to the address cleanse engine 120:

addr_search_results

The addr_search_results attribute contains a list of one or more records that match the search query and are returned to the address cleanse engine 120. The search results may contain the following attributes:

address.street.primary.name.streetName
address.street.primary.name.streetType
address.street.primary.name.streetPrefix
address.street.primary.name.streetSuffix
address.street.primary.number.houseNumber
address.street.primary2.name.streetName
address.street.primary2.name.streetType
address.cityRegionPostcode.city
address.cityRegionPostcode.region
address.cityRegionPostcode.postcode The following is a list of attributes that the address cleanse engine 120 may return to the application 126:

addr_search_status
addr_search_results—display field
(same list of input attributes)—non-display fields The addr_search_status attribute contains information that is helpful for the consuming application 126 to know what action to take when the user selects a candidate in the search results:

0: If the user selects one of the results, the application 126 may populate its fields with the contents of the non-display attributes. The full address is not yet ready to finalize.

1: If the user selects one of the results, the application 126 may re-send the selected address data to the cleanse engine 120. The full address is ready to finalize.

2: The full address is finalized.

The addr_search_results attribute contains a list of one or more candidate results to be displayed with the current field in the application 126 for the user to make a selection. The other attributes contain cleansed address data that the consuming application 126 uses to populate the address fields when the user selects one of the candidates.

The following are configuration settings that the integrator of a consuming application 126 has access to:

Number of candidates—Controls the number of candidate records that the search engine 128 returns. For example, when set to 10, the top 10 records are returned when the number of records in the result set is greater than 10. Default=6.

Begin search character—Controls when to begin performing the search. For example, when set to 3, the search engine 128 is not called until the user types the third character; and when set to 1, the search engine 128 is called right away with the first character typed. Default=1.

Fuzzy match begin character—Controls at which typed character to begin fuzzy matching. For example, when set to 10, for the first 9 characters typed the search engine 128 queries using "equals" or "begins with", but beginning with the 10th character it begins using fuzzy matching in the query. Default=10.

Fuzzy match minimum similarity—Controls the level of fuzziness allowed for queries that allow for fuzzy matching. For example, when set to 90, data has to match with a similarity of 90% or greater in order to be returned as a candidate. Default=90.

Search on subsequent field entry—Controls whether search is performed before the user types anything in a field when enough data is entered in other fields to bring back meaningful results. For example, when set to yes, say the user already entered a city that has only four postcodes associated to it. When the user enters the postcode field, a search is made to return the four postcodes for display without the user typing any data. Default=yes.

Output field mapping—Each input mapped field needs a generated attribute associated with it. This determines what data appears in the non-display fields returned to the application.

When the user wishes to use both the search engine 128 and suggestion lists, both the option to enable keystroke search and the option to enable suggestion lists are enabled. When this happens, the list of attributes returned from the cleanse engine 120 to the application 126 include attributes from the search engine 128 (addr_search_status) and attributes from suggestion lists (addr_sugg_count, addr_sugg_status, addr_sugg_error).

In the beginning of the interactive phase, when the user enters very limited data, the attributes are typically as follows:

addr_search_count: greater than 0
addr_search_status: 0
addr_sugg_count: 0
addr_sugg_status: N
addr_sugg_error: 0
addr_sugg_list: not returned In the middle of the interactive phase, when the application 126 begins to populate some fields, the attributes are typically as follows:

addr_search_count: greater than 0
addr_search_status: 0
addr_sugg_count: 0
addr_sugg_status: N
addr_sugg_error: 0
addr_sugg_list: not returned Near the end of the interactive phase, when the search engine 128 returns one or more candidates that represent fully deliverable addresses, the search engine 128 offers no further benefit and the attributes are typically as follows:

addr_search_count: greater than 0
addr_search_status: 1
addr_sugg_count: 0
addr_sugg_status: N
addr_sugg_error: 0
addr_sugg_list: not returned At the end when the user selects an address returned with addr_search_status=1, if the cleanse engine detects suggestion lists available when it finalizes the address, the attributes are typically as follows:

addr_search_count: 0
addr_search_status: 2
addr_sugg_count: greater than 0
addr_sugg_status: status value other than N
addr_sugg_error: 1
addr_sugg_list: multiple suggestions To determine what action to take, the application 126 needs to look at the values in addr_search_status and addr_sugg_status.

When the cleanse engine 120 returns a suggestion list back to the application 126 instead of a keystroke search result list, the display of the suggestions is in some ways similar to keystroke search candidates and in some ways different. When a suggestion is an exact entry, such as "Suite 310", then the selection is similar to keystroke search candidates. However, when a suggestion is a range, such as "Suite 300-320" then that suggestion needs a text box for the user to manually enter the intended suite number within the range, and there is no keystroke action as they type the value.

Figure 2:
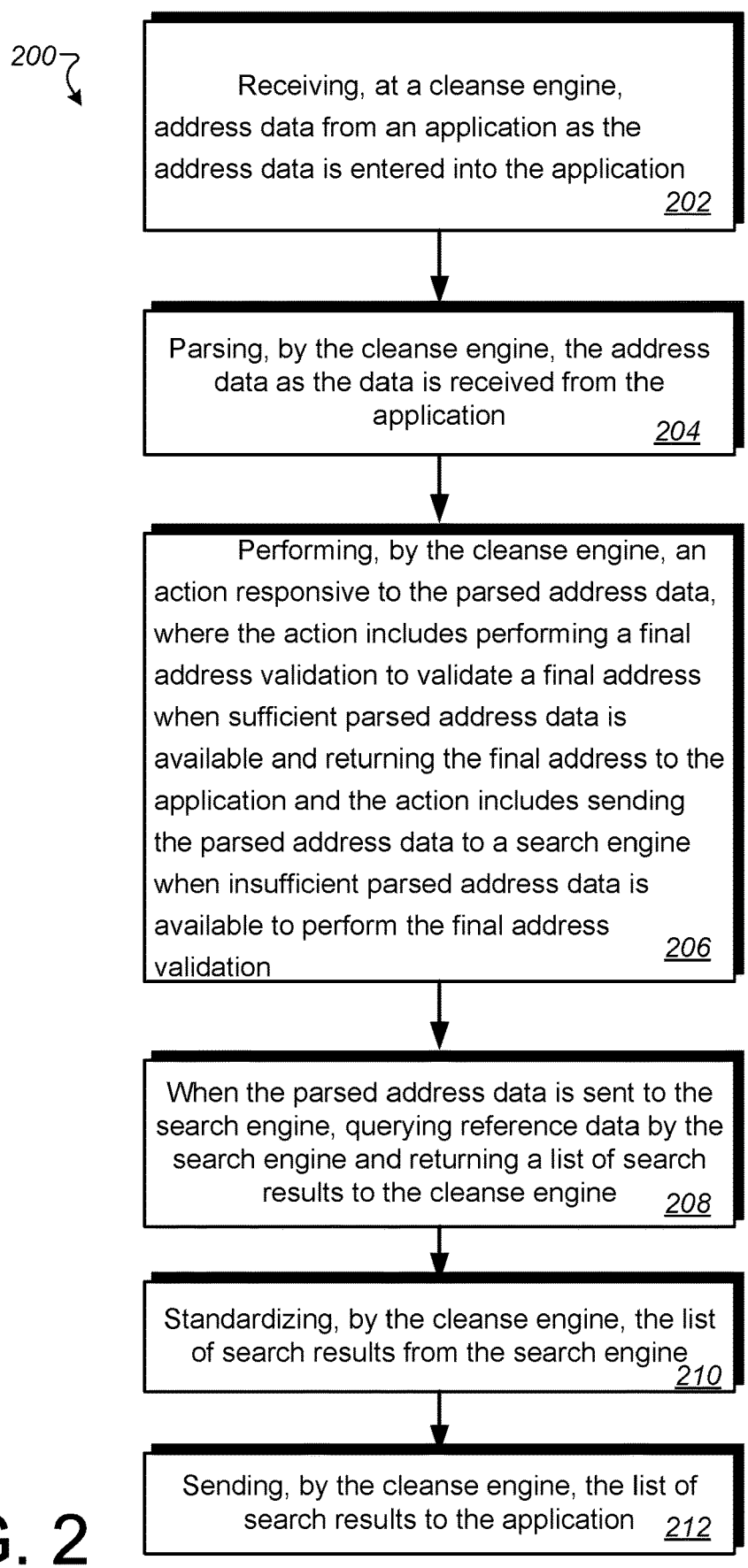
FIG. 2 is a flowchart illustrating example operations of the system of FIG. 1.

Referring to FIG. 2, process 200 illustrates example operations of the system 100 of FIG. 1. Process 200 includes receiving, at a cleanse engine, address data from an application as the address data is entered into the application (202). For example, the cleanse engine 120 receives address data 117 from the application 126 as the address data 117 is entered into the application 126.

Process 200 includes parsing, by the cleanse engine, the address data as the data is received from the application (204). For example, the cleanse engine 120 parses the address data 117 as the address data 117 is received from the application 126.

Process 200 includes performing, by the cleanse engine, an action responsive to the parsed address data. The action includes performing a final address validation to validate a final address when sufficient parsed address data is available and returning the final address to the application. The action includes sending the parsed address data to a search engine when insufficient parsed address data is available to perform the final address validation (206). For example, the cleanse engine 120 determines which action to take based on the sufficiency of the parsed address data. If there is enough parsed address data, then the cleanse engine 120 can validate a final address and return the final address to the application 126. If there is not enough parsed address data that can return a final address, then the cleanse engine 120 sends the parsed address data to the search engine 128.

Process 200 also includes when the parsed address data is sent to the search engine, querying reference data by the search engine and returning a list of search results to the cleanse engine (208). For example, the search engine 128 queries the reference data 112 and returns a list of results to the cleanse engine 120.

Process 200 includes standardizing, by the cleanse engine, the list of search results from the search engine (210) and sending, by the cleanse engine, the list of search results to the application (212). For example, the cleanse engine 120 standardizes the list of search results from the search engine 128 and then sends the list of search results to the application 126. Depending on the interactions of the user with the application 126 and the sent list of search results, the cleanse engine 120 can take various actions. For instance, if the user continues typing in one or more of the fields, then process 200 may be repeated until a final address is returned to the application 126. If the user selects a result from the list of results, then the cleanse engine receives the selection from the list of search results from the application including the non-display data associated with the selection. The cleanse engine performs the final address validation on the non-display data associated with the selection and returns the final address to the application.

Below are many different scenarios, which provide examples for the working of the global address cleanse system 100.

Figure 3A:
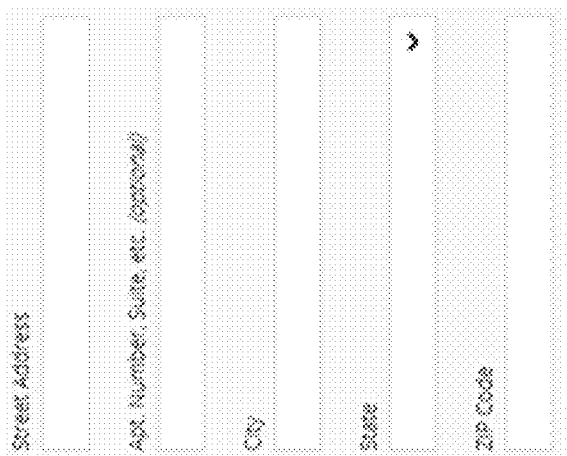

In these scenarios, the user is typing into a form with the following schema. Data being sent from the application 126 to the cleanse engine 120 refers to address data 117, but in the scenarios below is simply referred to as data. The user begins by typing in the Street Address field, planning to complete the City, State, and ZIP Code fields after completing the street address as shown at FIG. 3A.

Scenario: United States Street Address

Complete address desired by user: 620 N Lake Shore Dr, Chicago Ill. 60611.

The user begins by typing the first character "6" into the Street Address field.

Address=6

Data sent from the application 126 to the cleanse engine 120.

```
{
    country: "US",
    mixed: "6",
    mixed2: "",
    locality: "",
    region: "",
    postcode: "",
    current_field: "mixed"
}
```

The cleanse engine 120 parses the data, identifies that it is too incomplete to validate the address, and therefore sends parsed data to the search engine 128. Note that at the first character the parse is unintelligent.

```
{
country: "US",
    addr_search:
        {
            address.street.primary.number.houseNumber: "6",
    current_token: "address.street.primary.number.houseNumber"
        }
}
```

The search engine 128 queries where country="US" and houseNumber="6". Results are grouped, ordered by count, and the top six are selected to send back to the cleanse engine 120.

```
{
    addr_search_results: [6]
        {
            address.street.primary.name.streetName: "MAIN",
            address.street.primary.name.streetType: "STREET",
            address.street.primary.number.houseNumber: "6"
        },
        {
            address.street.primary.name.streetName: "OLYMPIC",
            address.street.primary.name.streetType: "ROAD",
            address.street.primary.number.houseNumber: "6"
        },
        {
            address.street.primary.name.streetName: "STATE",
            address.street.primary.name.streetType: "STREET",
            address.street.primary.name.streetSuffix: "WEST",
            address.street.primary.number.houseNumber: "6"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "6 Main St",
            country: "US",
                mixed: "6 Main St",
            mixed2: "",
            locality: "",
            region: "",
            postcode: ""
                },
                {
                result: "6 Olympic Rd",
            country: "US",
                mixed: "6 Olympic Rd",
            mixed2: "",
            locality: "",
```

```
            region: "",
            postcode: ""
        },
        {
            result: "6 State St W",
            country: "US",
                mixed: "6 State St W",
            mixed2: "",
            locality: "",
            region: "",
            postcode: ""
        },
        ...
}
```

Figure 3B:
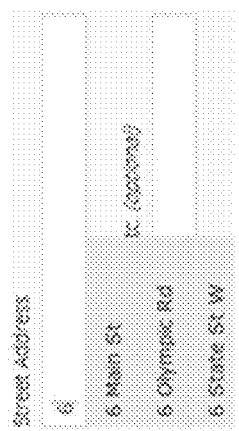

The application 126 displays the candidates to the user. The user may select one of the addresses from the list, or may ignore the list and keep typing as shown at FIG. 3B.

None of the addresses displayed is the desired address, and so the user types the next character.

Address=62

Data sent from the application 126 to the cleanse engine 120.

```
{
    country: "US",
    mixed: "62",
    mixed2: "",
    locality: "",
    region: "",
    postcode: "",
    current_field: "mixed"
}
```

The cleanse engine 120 parses the data, identifies that it is too incomplete to validate the address, and sends parsed data to the search engine 128. Note that at the second character the parse is still unintelligent.

```
{
country: "US",
    addr_search:
    {
        address.street.primary.number.houseNumber: "62",
current_token: "address.street.primary.number.houseNumber"
    }
}
```

The search engine 128 queries where country="US" and houseNumber="62". Results are grouped, ordered by count, and the top six are selected to send back to the cleanse engine 120.

```
{
    addr_search_results: [6]
    {
        address.street.primary.name.streetName: "MARKET",
        address.street.primary.name.streetType: "STREET",
        address.street.primary.number.houseNumber: "62"
    },
    {
        address.street.primary.name.streetName: "HARTLAND",
        address.street.primary.name.streetType: "ROAD",
        address.street.primary.number.houseNumber: "62"
    },
    {
        address.street.primary.name.streetName: "APPLEWOOD",
        address.street.primary.name.streetType: "COURT",
        address.street.primary.name.streetPrefix: "SOUTH",
```

```
        address.street.primary.number.houseNumber: "62"
    },
    ...
}
```

The cleanse engine 120 performs basic standardization and sends candidates back to the application 126.

```
{
    std_addr_country_2char: "US",
    addr_search_status: "0",
        addr_search_results: [6]
        {
            result: "62 Market St",
            country: "US",
                mixed: "62 Market St",
            mixed2: "",
            locality: "",
            region: "",
            postcode: ""
        },
        {
            result: "62 Hartland Rd",
            country: "US",
                mixed: "62 Hartland Rd",
            mixed2: "",
            locality: "",
            region: "",
            postcode: ""
        },
        {
            result: "62 S Applewood Ct",
            country: "US",
                mixed: "62 S Applewood Ct",
            mixed2: "",
            locality: "",
            region: "",
            postcode: ""
        },
        ...
}
```

Figure 3C:
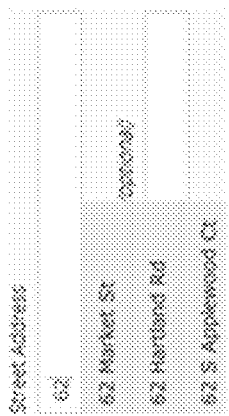

The application 126 displays the candidates to the user as shown at FIG. 3C.

The user still does not see the desired address and therefore continues to type.

Address=620

Data sent from the application 126 to the cleanse engine 120.

```
{
    country: "US",
    mixed: "620",
    mixed2: "",
    locality: "",
    region: "",
    postcode: "",
    current_field: "mixed"
}
```

The cleanse engine 120 parses the data, identifies that it is too incomplete to validate the address, and sends parsed data to the search engine 128. Note that at the third character the parse is now intelligent.

```
{
country: "US",
    addr_search:
    {
        address.street.primary.number.houseNumber: "620",
```

15
-continued

```
        current_token: "address.street.primary.number.houseNumber"
        },
        {
                address.street.primary.name.streetName: "620",
        current_token: "address.street.primary.name.streetName"
        }
}
```

The search engine 128 queries where country="US" and houseNumber="620". Results are grouped, ordered by count, and the top six are selected to send back to the cleanse engine 120.

```
{
        addr_search_results: [6]
        {
                address.street.primary.name.streetName: "RIVER",
                address.street.primary.name.streetType: "ROAD",
                address.street.primary.number.houseNumber: "620"
        },
        {
                address.street.primary.name.streetName: "HILLVIEW",
                address.street.primary.name.streetType: "AVENUE",
                address.street.primary.number.houseNumber: "620"
        },
        {
                address.street.primary.name.streetName: "MAXWELL",
                address.street.primary.name.streetType: "DRIVE",
                address.street.primary.number.houseNumber: "620"
        },
        ...
}
```

The cleanse engine 120 performs basic standardization and sends candidates back to the application 126.

```
        {
        std_addr_country_2char: "US",
        addr_search_status: "0",
                addr_search_results: [6]
                {
                        result: "620 River Rd",
                country: "US",
                        mixed: "620 River Rd",
                mixed2: " ",
                locality: " ",
                region: " ",
                postcode: " "
                },
                {
                        result: "620 Hillview Ave",
                country: "US",
                        mixed: "620 Hillview Ave",
                mixed2: " ",
                locality: " ",
                region: " ",
                postcode: " "
                },
                {
                        result: "620 Maxwell Dr",
                country: "US",
                        mixed: "620 Maxwell Dr",
                mixed2: " ",
                locality: " ",
                region: " ",
                postcode: " "
                },
                ...
        }
```

Figure 3D:
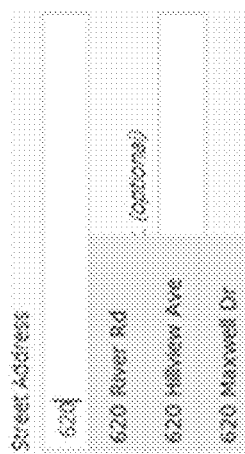

The application 126 displays the candidate list to the user as shown at FIG. 3D.

The user still does not see the desired address and therefore continues to type.

Address=620+space

Data sent from the application 126 to the cleanse engine 120. Notice that the space is sent.

```
                {
                        country: "US",
                        mixed: "620 ",
                        mixed2: " ",
                        locality: " ",
                        region: " ",
                        postcode: " ",
                        current_field: "mixed"
                }
```

The cleanse engine 120 parses the data, identifies that it is too incomplete to validate the address, and sends parsed data to the search engine 128. Because the data in the current field ends with a space, the cleanse engine 120 sends the current_token_stop attribute indicating that the user may be finished typing the current token.

```
        {
country: "US",
        addr_search:
                {
                        address.street.primary.number.houseNumber: "620",
        current_token: "address.street.primary.number.houseNumber",
        current_token_stop: "y"
                },
                {
                        address.street.primary.name.streetName: "620",
        current_token: "address.street.primary.name.streetName",
        current_token_stop: "y"
                }
        }
```

The search engine 128 queries where country="US" and houseNumber="620". The current_token_stop attribute with value of "y" changes the search engine 128 to query with "equals" instead of "begins with", resulting in addresses that have the exact house number of 620. Note that for countries that normally position the house number before the street name, the keystroke search results are the same.

```
{
        addr_search_results: [6]
        {
                address.street.primary.name.streetName: "RIVER",
                address.street.primary.name.streetType: "ROAD",
                address.street.primary.number.houseNumber: "620"
        },
        {
                address.street.primary.name.streetName: "HILLVIEW",
                address.street.primary.name.streetType: "AVENUE",
                address.street.primary.number.houseNumber: "620"
        },
        {
                address.street.primary.name.streetName: "MAXWELL",
                address.street.primary.name.streetType: "DRIVE",
                address.street.primary.number.houseNumber: "620"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "620 River Rd",
    country: "US",
                mixed: "620 River Rd",
    mixed2: " ",
    locality: " ",
    region: " ",
    postcode: " "
            },
            {
                result: "620 Hillview Ave",
    country: "US",
                mixed: "620 Hillview Ave",
    mixed2: " ",
    locality: " ",
    region: " ",
    postcode: " "
            },
            {
                result: "620 Maxwell Dr",
    country: "US",
                mixed: "620 Maxwell Dr",
    mixed2: " ",
    locality: " ",
    region: " ",
    postcode: " "
            },
            ...
}
```

Figure 3E:
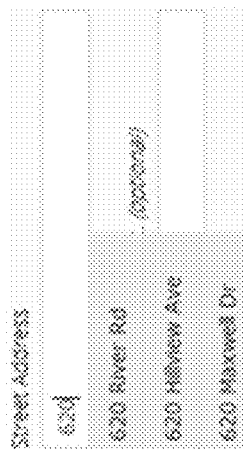

The application 126 displays the candidate list to the user as shown in FIG. 3E.

The user still does not see the desired address and therefore continues to type.

Address=620 N

Data sent from the application 126 to the cleanse engine 120.

```
{
    country: "US"
    mixed: "620 n",
    mixed2: " ",
    locality: " ",
    region: " ",
    postcode: " ",
    current_field: "mixed"
}
```

The cleanse engine 120 parses the data, identifies that it is too incomplete to validate the address, and sends parsed data to the search engine 128. Notice that the cleanse engine 120 identifies four possible parses, ranking them in order of probability.

```
{
    country: "US",
        addr_search:
            {
                address.street.primary.number.houseNumber:
                    "620",
                address.street.primary.name.streetName:
                    "N",
    current_token: "address.street.primary.name.streetName"
            },
            {
                address.street.primary.number.houseNumber:
                    "620",
                address.street.primary.name.streetPrefix:
                    "N",
    current_token: "address.street.primary.name.streetPrefix"
            },
            {
                address.street.primary.number.houseNumber:
                    "620 N",
    current_token: "address.street.primary.number.houseNumber"
            },
            {
                address.street.primary.name.streetName:
                    "620",
                address.street.primary.name.streetSuffix:
                    "N",
                current_token:
"address.street.primary.name.streetSuffix"
            }
}
```

Beginning with the first ranked parse, the search engine 128 queries where country="US", houseNumber="620", and streetName begins with "N". Results are grouped, ordered by count, and the top six are selected to send back to the cleanse engine 120.

```
{
    addr_search_results: [6]
        {
            address.street.primary.name.streetName:
                "NOTTINGHAM",
            address.street.primary.name.streetType: "BOULEVARD",
            address.street.primary.number.houseNumber: "620"
        },
        {
            address.street.primary.name.streetName: "NORTH",
            address.street.primary.name.streetType: "AVENUE",
            address.street.primary.number.houseNumber: "6200"
        },
        {
            address.street.primary.name.streetName: "NARROW",
            address.street.primary.name.streetType: "LANE",
            address.street.primary.number.houseNumber: "620"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "620 Nottingham Blvd",
    country: "US",
                mixed: "620 Nottingham Blvd",
    mixed2: " ",
    locality: " ",
    region: " ",
    postcode: " "
            },
            {
                result: "620 North Ave",
    country: "US",
                mixed: "620 North Ave",
    mixed2: " ",
    locality: " ",
    region: " ",
    postcode: " "
            },
            {
                result: "620 Narrow Ln",
    country: "US",
                mixed: "620 Narrow Ln",
    mixed2: " ",
```

```
            locality: " ",
            region: " ",
            postcode: " "
                    },
                ...
        }
```

Figure 3F:
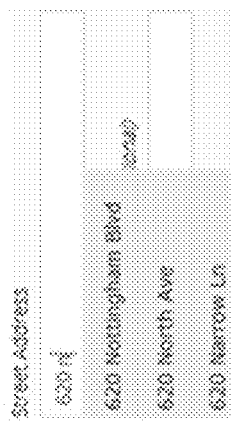

The application 126 displays the candidate list to the user as shown at FIG. 3F.

The user still does not see the desired address and therefore continues to type.

Address=620 N+space

Data sent from the application 126 to the cleanse engine 120. Notice that the space is sent.

```
        {
        country: "US",
        mixed: "620 n ",
        mixed2: " ",
        locality: " ",
        region: " ",
        postcode: " ",
        current_field: "mixed"
        }
```

The cleanse engine 120 parses the data, identifies that it is too incomplete to validate the address, and sends parsed data to the search engine 128. Notice that the current_token_stop attribute is sent because of the trailing space, and notice that the parses are ranked differently.

```
    {
country: "US",
        addr_search:
            {
                address.street.primary.number.houseNumber:
                "620",
                address.street.primary.name.streetPrefix:
                "N",
    current_token: "address.street.primary.name.streetPrefix",
    current_token_stop: "y"
            },
            {
                address.street.primary.number.houseNumber:
                "620",
                address.street.primary.name.streetName:
                "N",
    current_token: "address.street.primary.name.streetName",
    current_token_stop: "y"
            },
            {
                address.street.primary.number.houseNumber:
                "620 N",
    current_token: "address.street.primary.number.houseNumber",
    current_token_stop: "y"
            },
            {
                address.street.primary.name.streetName:
                "620",
                address.street.primary.name.streetSuffix:
                "N",
                current_token:
"address.street.primary.name.streetSuffix",
                current_token_stop: "y"
            },
    }
```

The search engine 128 queries where country="US", houseNumber="620", and streetPrefix="N". Notice that the search engine 128 queries with "equals" instead of "begins with" because of the current_token_stop attribute. Results are grouped, ordered by count, and the top six are selected to send back to the cleanse engine 120.

```
{
    addr_search_results: [6]
        {
            address.street.primary.name.streetName: "FAIRWAY",
            address.street.primary.name.streetType: "STREET",
            address.street.primary.name.streetPrefix: "NORTH",
            address.street.primary.number.houseNumber: "620"
        },
        {
            address.street.primary.name.streetName: "JACKSON",
            address.street.primary.name.streetType: "STREET",
            address.street.primary.name.streetPrefix: "NORTH",
            address.street.primary.number.houseNumber: "620"
        },
        {
            address.street.primary.name.streetName: "MADISON",
            address.street.primary.name.streetType: "AVENUE",
            address.street.primary.name.streetPrefix: "NORTH",
            address.street.primary.number.houseNumber: "620"
        },
        ...
}
```

The cleanse engine 120 performs basic standardization and sends candidates back to the application 126.

```
    {
    std_addr_country_2char: "US",
    addr_search_status: "0",
        addr_search_results: [6]
            {
                        result: "620 N Fairway St",
            country: "US",
                        mixed: "620 N Fairway St",
            mixed2: " ",
            locality: " ",
            region: " ",
            postcode: " "
            },
            {
                        result: "620 N Jackson St",
            country: "US",
                        mixed: "620 N Jackson St",
            mixed2: " ",
            locality: " ",
            region: " ",
            postcode: " "
            },
            {
                        result: "620 N Madison Ave",
            country: "US",
                        mixed: "620 N Madison Ave",
            mixed2: " ",
            locality: " ",
            region: " ",
            postcode: " "
            },
            ...
    }
```

Figure 3G:
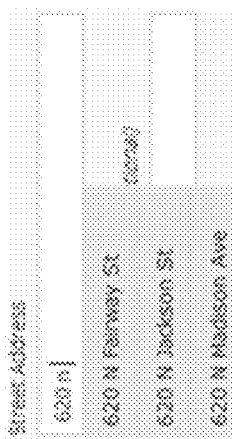

The application 126 displays the candidate list to the user as shown in FIG. 3G.

The user still does not see the desired address and therefore continues to type.

Address 620 N L

Data sent from the application 126 to the cleanse engine 120.

```
        {
        country: "US",
        mixed: "620 n l",
```

```
            mixed2: " ",
            locality: " ",
            region: " ",
            postcode: " ",
            current_field: "mixed"
        }
```

The cleanse engine 120 parses the data, identifies that it is too incomplete to validate the address, and sends parsed data to the search engine 128.

```
{
country: "US",
        addr_search:
            {
                address.street.primary.number.houseNumber: "620",
                address.street.primary.name.streetPrefix: "N",
                address.street.primary.name.streetName: "L",
    current_token: "address.street.primary.name.streetName"
            },
}
```

The search engine 128 queries where country="US", houseNumber="620", streetPrefix="N", and streetName begins with "L". Results are grouped, ordered by count, and the top six are selected to send back to the cleanse engine 120.

```
{
        addr_search_results: [6]
            {
                address.street.primary.name.streetName: "LONG",
                address.street.primary.name.streetType: "STREET",
                address.street.primary.name.streetPrefix: "NORTH",
                address.street.primary.number.houseNumber: "620"
            },
            {
                address.street.primary.name.streetName: "LARKIN",
                address.street.primary.name.streetType: "STREET",
                address.street.primary.name.streetPrefix: "NORTH",
                address.street.primary.number.houseNumber: "620"
            },
            {
                address.street.primary.name.streetName: "LITTLE
ROCK",
                address.street.primary.name.streetType: "STREET",
                address.street.primary.name.streetPrefix: "NORTH",
                address.street.primary.number.houseNumber: "620"
            },
            ...
}
```

The cleanse engine 120 performs basic standardization and sends candidates back to the application 126.

```
            {
        std_addr_country_2char: "US",
        addr_search_status: "0",
                addr_search_results: [6]
                }
                        result: "620 N Long St",
            country: "US",
                        mixed: "620 N Long St",
            mixed2: "",
            locality: "",
            region: "",
            postcode: ""
                },
            {
                        result: "620 N Larkin St",
            country: "US",
                        mixed: "620 N Larkin St",
            mixed2: "",
            locality: "",
            region: "",
            postcode: ""
                },
            {
                        result: "620 N Little Rock St",
            country: "US",
                        mixed: "620 N Little Rock St",
            mixed2: "",
            locality: "",
            region: "",
            postcode: ""
                },
            ...
}
```

Figure 3H:
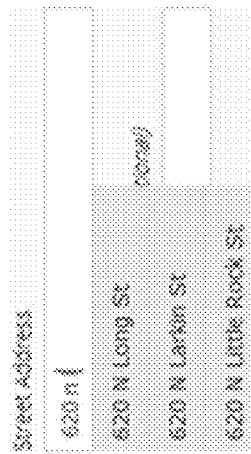

The application 126 displays the candidate list to the user as shown at FIG. 3H.

The user still does not see the desired address and therefore continues to type.

Address=620 N La . . . 620 N Lake Shor

The process continues with each character entered by the user. Now skip to where the user enters almost the entire street name. It is common for this to happen when the street name is common to many cities in the country.

Data sent from the application 126 to the cleanse engine 120.

```
            {
            country: "US",
            mixed: "620 n lake shor",
            mixed2: "",
            locality: "",
            region: "",
            postcode: "",
            current_field: "mixed"
            }
```

The cleanse engine 120 parses the data, identifies that it is too incomplete to validate the address, and sends parsed data to the search engine 128.

```
{
country: "US",
        addr_search:
            {
                address.street.primary.number.houseNumber: "620",
                address.street.primary.name.streetPrefix: "N",
                address.street.primary.name.streetName: "LAKE
                    SHOR",
    current_token: "address.street.primary.name.streetName"
            },
}
```

The search engine 128 queries where country="US", houseNumber="620", streetPrefix="N", and streetName begins with "LAKE SHOR". Results are grouped, ordered by count, and the top six are selected to send back to the cleanse engine 120.

```
{
    addr_search_results: [6]
        {
            address.street.primary.name.streetName: "LAKE SHORE",
            address.street.primary.name.streetType: "STREET",
```

```
            address.street.primary.name.streetPrefix: "NORTH",
            address.street.primary.number.houseNumber: "620"
        },
        {
            address.street.primacy.name.streetName: "LAKE SHORE",
            address.street.primary.name.streetType: "ROAD",
            address.street.primary.name.streetPrefix: "NORTH",
            address.street.primary.number.houseNumber: "620"
        },
        {
            address.street.primary.name.streetName: "LAKE SHORE",
            address.street.primary.name.streetType: "DRIVE",
            address.street.primary.name.streetPrefix: "NORTH",
            address.street.primary.number.houseNumber: "620"
        },
        ...
}
```

The cleanse engine 120 performs basic standardization and sends candidates back to the application 126.

```
{
std_addr_country_2char: "US",
addr_search_status: "0",
        addr_search_results: [6]
            {
                result: "620 N Lake Shore St",
            country: "US",
                        mixed: "620 N Lake Shore St",
            mixed2: "",
            locality; "",
            region: "",
            postcode: ""
            },
            {
                result; "620 N Lake Shore Rd",
            country: "US",
                        mixed: "620 N Lake Shore Rd",
            mixed2: "",
            locality: "",
            region: "",
            postcode: ""
            },
            {
                result: "620 N Lake Shore Dr",
            country: "US",
                        mixed: "620 N Lake Shore Dr",
            mixed2: "",
            locality: "",
            region: "",
            postcode: ""
            },
            ...
}
```

Figure 31:
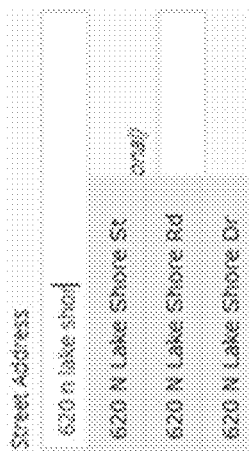

The application 126 displays the candidate list to the user as shown in FIG. 31.

The user sees the desired address and selects "620 Lake Shore Dr" as shown in FIG. 37. Now the application 126 looks at the search status code to see what action to take. Because addr_search_status="0" the application 126 overwrites fields with the non-display attributes, in this case mixed, and waits for more user action.

Now the user enters the City field.

City=blank

If the configuration setting is enabled to perform a search in a subsequent field before entering data, as soon as the user enters the City field the application 126 sends the previously selected address data, this time with locality as the current field.

```
    {
    country: "US",
    mixed: "620 N Lake Shore Dr",
    mixed2: "",
    locality: "",
    region: "",
    postcode: "",
    current_field: "locality"
    }
```

The cleanse engine 120 parses the data, identifies that it is too incomplete to validate the address, and sends parsed data to the search engine 128. Notice that the city token is empty, and the current token is city.

```
    {
country: "US",
        addr_search:
        {
            address.street.primary.number.houseNumber: "620",
            address.street.primary.name.street Prefix; "N",
            address.street.primary.name.streetName: "LAKE
                SHORE",
            address.street.primary.name.streetType: "DR",
            address.cityRegionPostcode.city: "",
        current_token: "address.cityRegionPostcode.city"
        },
    }
```

The search engine 128 queries localities where country="US", houseNumber="620", streetPrefix="N", streetName="LAKE SHORE", and streetType="DR".

```
    {
        addr_search_results: [6]
        {
            address.cityStateRegion.city: "MILWAUKEE",
            address.cityStateRegion.region: "WI"
        },
        {
            address.cityStateRegion.city: "JACKSONVILLE",
            address.cityStateRegion.region: "FL"
        },
        {
            address.cityStateRegion.city: "SYRACUSE",
            address.cityStateRegion.region: "NY"
        },
        ...
    }
```

The cleanse engine 120 performs basic standardization and sends candidates back to the application 126. Notice that the addr_search_status="1", indicating that if the user selects one of these candidates then the full address can be finalized.

```
    {
    std_addr_country_2char: "US",
    addr_search_status: "1",
        addr_search_results: [6]
            {
                result: "Milwaukee WI",
            country: "US",
                        mixed: "620 N Lake Shore Dr",
            mixed2: "",
                locality; "Milwaukee",
                region: "WI",
            postcode: ""
            },
            {
```

```
                result: "Jacksonville FL",
    country: "US",
                mixed: "620 N Lake Shore Dr",
    mixed2: "",
                locality: "Jscksonville",
                region: "FL",
    postcode: ""
            },
            {
                result: "Syracuse NY",
    country: "US",
                mixed: "620 N Lake Shore Dr",
    mixed2: "",
                locality: "Syracuse",
                region: "NY",
    postcode: ""
            },
            ...
    }
```

Figure 3J:
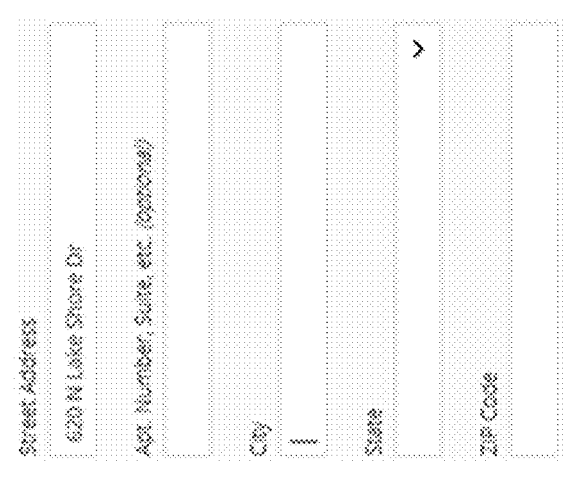
Figure 3K:
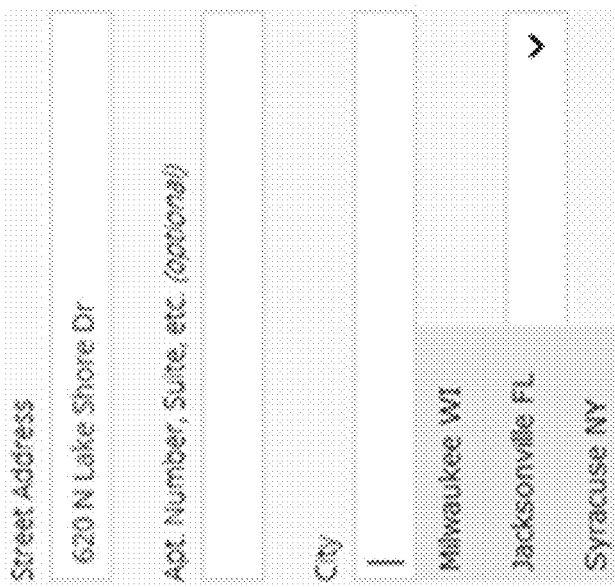

The application 126 displays the candidate list to the user as shown in FIG. 3K.

The user does not see the desired city and therefore begins to type.

City=C

Data sent from the application 126 to the cleanse engine 120.

```
        }
    country: "US",
    mixed: "620 N Lake Shore Dr",
    mixed2: "",
    locality: "c",
    region: "",
    postcode: "",
    current_field: "locality"
        }
```

The cleanse engine 120 parses the data, identifies that it is too incomplete to validate the address, and sends parsed data to the search engine 128.

```
    {
country: "US",
        addr_search:
            {
                address.street.primary.number.houseNumber: "620",
                address.street.primary.name.streetPrefix: "N",
                address.street.primary.name.streetName: "LAKE SHORE",
                address.street.primary.name.streetType: "DR",
                address.cityRegionPostcode.city: "C",
    current_token: "address.cityRegionPostcode.city"
            },
    }
```

The search engine 128 queries localities where country="US", houseNumber="620", streetPrefix="N", streetName="LAKE SHORE", streetType="DR", and city begins with "C".

```
{
    addr_search_results: [3]
        {
            address.cityStateRegion.city: "CHATTENOOGA",
            address.cityStateRegion.region: "TN"
        },
        {
            address.cityStateRegion.city: "CHICAGO",
            address.cityStateRegion.region: "IL"
        },
        {
            address.cityStateRegion.city; "CHAMBERSBURG",
            address.cityStateRegion.region: "PA"
        },
}
```

The cleanse engine 120 performs basic standardization and sends candidates back to the application 126.

```
    {
    std_addr_country_2char: "US",
    addr_search_status: "1",
            addr_search_results: [3]
                {
                    result: "Chattenooga TN",
    country: "US",
                    mixed: "620 N Lake Shore Dr",
    mixed2: "",
                    locality: "Chattenooga",
                    region: "TN",
    postcode: ""
                },
                {
                    result: "Chicago IL",
    country: "US",
                    mixed: "620 N Lake Shore Dr",
    mixed2: "",
                    locality: "Chicago",
                    region: "IL",
    postcode: ""
                },
                {
                    result: "Chambersburg PA",
    country: "US",
                    mixed: "620 N Lake Shore Dr",
    mixed2: "",
                    locality: "Chambersburg",
                    region: "PA",
    postcode; ""
                },
                ...
            }
```

Figure 3L:
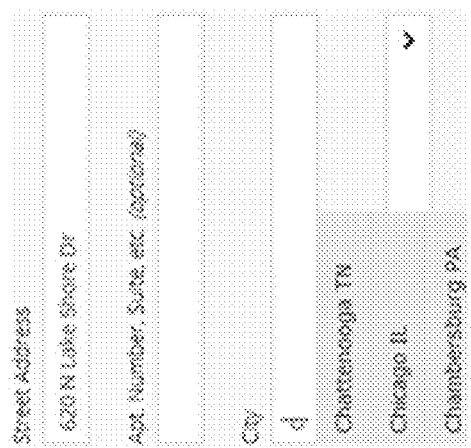

The application 126 displays the candidate list to the user as shown in FIG. 3L.

The user sees the desired city and selects it. Now the application 126 looks at the search status code to see what action to take. Because addr_search_status="1" the application 126 sends another request to finalize the address.

Full Address Match

Data sent from the application 126 to the cleanse engine 120.

```
    {
    country: "US",
    mixed: "620 N Lake Shore Dr",
    locality: "Chicago",
    region: "IL",
    current_field: "locality"
        }
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
    addr_search_status: "2",
    std_addr_country_2char: "US",
        std_addr_prim_address: "620 N Lake Shore Dr",
        std_addr_sec_address: "",
        std_addr_locality_full: "Chicago",
        std_addr_region_full: "IL",
        std_addr_postcode_full: "60611-4025"
}
```

Figure 3M:
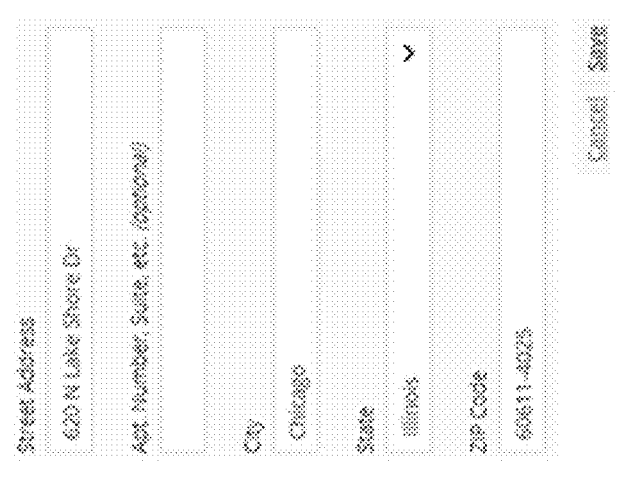

With addr_search_status="2", the application 126 now populates the fields with the validated, corrected data. It may also enable the "Save" button, "Next" button, or whatever the next action is for the end user in the form (see FIG. 3M).

Scenario (Variation): Rare Street

Complete address desired by user: 160 Zwolak Ct, South Plainfield N.J. 07080.

Figure 3N:
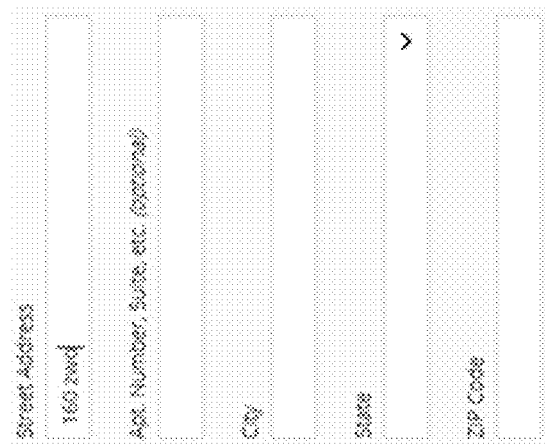
Figure 30:
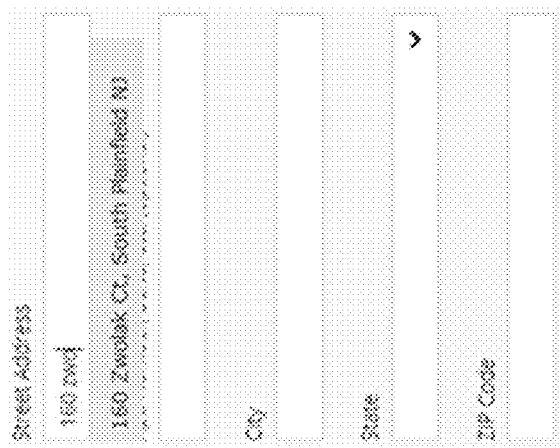

The process is the same as the "United States street address" scenario for the first six characters, but what differs with a rare street name begins with the 7$^{th}$ character (see FIG. 3N).

Data sent from the application 126 to the cleanse engine 120.

```
{
    country: "US",
    mixed: "160 zwo",
    mixed2: "",
    locality: "",
    region: "",
    postcode: "",
    current_field: "mixed"
}
```

The cleanse engine 120 parses the data, identifies that it is too incomplete to validate the address, and sends parsed data to the search engine 128.

```
{
    country: "US",
    addr_search:
    {
        address.street.primary.number.houseNumber: "160",
        address.street.primary.name.streetName: "ZWO",
        current_token: "address.street.primary.name.streetName"
    },
}
```

The search engine 128 queries where country="US", houseNumber="160", and streetName begins with "ZWO". In the previous scenario in which the street address had a common street name, multiple cities have the address and so the search engine 128 returned only the house number, street name, and street type, grouped so that only one record per street address appears in the search results. In this scenario of a rare street name, there is only one city that has the partial address, and therefore the city and region are also returned.

```
{
    addr_search_results: [1]
    {
        address.street.primary.name.streetName: "ZWOLAK",
        address.street.primary.name.streetType: "COURT",
        address.street.primary.number.houseNumber: "160",
        address.cityStateRegion.city: "SOUTH PLAINFIELD",
        address.cityStateRegion.region: "NJ"
    }
}
```

The cleanse engine 120 performs basic standardization and sends the single candidate back to the application 126. In the previous scenario the addr_search_status=0 when searching for the street address, but in this scenario in which the city and region are identified, addr_search_status=1 because of the uniqueness of the street address, indicating that if the user selects the address then the application 126 can re-send it to be finalized.

```
{
    std_addr_country_2char: "US",
    addr_search_status: "1",
        addr_search_results: [1]
        {
            result: "160 Zwolak Ct, South Plainfield NJ",
            country: "US",
                mixed: "160 Zwolak Ct",
            mixed2: "",
            locality: "South Plainfield",
            region: "NJ",
            postcode: ""
        },
}
```

The application 126 displays the candidate list with a single candidate to the user (FIG. 3O).

The user sees the desired address and selects it. Because addr_search_status="1" the application 126 sends another request to finalize the address.

Data sent from the application 126 to the cleanse engine 120.

```
{
    country: "US",
    mixed: "160 Zwolak Ct",
    locality: "South Plainfield",
    region: "NJ",
    current_field: "mixed"
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
    addr_search_status: "2",
    std_addr_country_2char: "US",
        std_addr_prim_address: "160 Zwolak Ct",
        std_addr_sec_address: "",
        std_addr_locality_full: "South Plainfield",
        std_addr_region_full: "NJ",
        std_addr_postcode_full: "07080-6118"
}
```

Figure 3P:
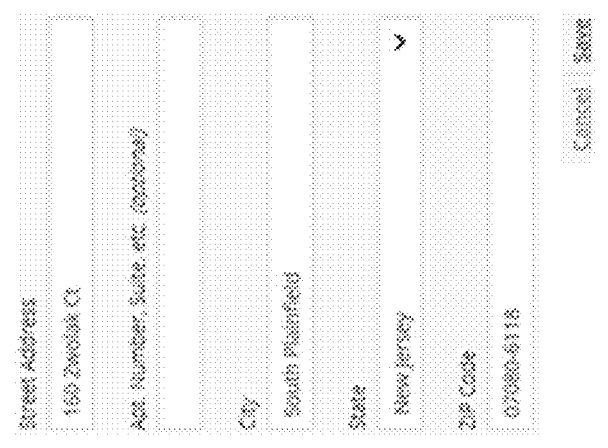

With addr_search_status="2", the application 126 now populates the fields with the validated, corrected data, and enables the "Save" button (FIG. 3P).

Scenario (Variation): Separate Fields for House Number, Street, and Unit

Complete address desired by user: 620 N Lake Shore Dr, Chicago Ill. 60611.

Figure 3Q:
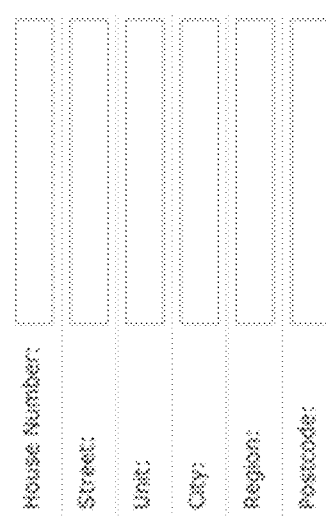

In this scenario the user is typing into a form with multiple discrete fields for the address instead of a single free-form address field. The user begins by typing in the House Number field (FIG. 3Q).

The process is the same as the "United States street address" scenario for the whole process of searching and validating the delivery address, but what differs with this scenario is that when the cleanse engine 120 parses data it restricts possible parses to those where the value typed in the House Number field are assumed to be house number. It does not send to the search engine 128 possible parses where the value in the House Number field can possibly be a street name or a building name, as it does when the value is entered in a free-form address field.

Example

Figure 3R:
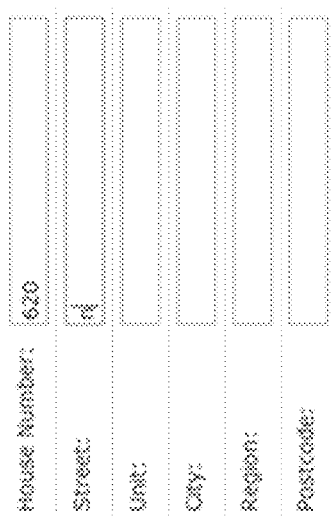

Say the interaction with the user is at the step of having entered "620 N" as shown at FIG. 3R.

In the "United States street address" scenario, when these same characters were entered in a single free-form address field, the cleanse engine 120 identified four possible parses. However, when the "620" can be assumed to be house number, it will identify only two possible parses.

Data sent from the application 126 to the cleanse engine 120.

```
{
    country: "US",
    street: "n",
    house_num: "620",
    house_num2: "",
    locality: "",
    region: "",
    postcode: "",
    current_field: "street"
}
```

The cleanse engine 120 parses the data, identifies that it is too incomplete to validate the address, and sends parsed data to the search engine 128. Notice that the cleanse engine 120 identifies only two possible parses, because the "620" can be assumed to be house number, and the "N" can be assumed to not be house number.

```
{
country: "US",
    addr_search:
    {
        address.street.primary.number.houseNumber: "620",
        address.street.primary.name.streetName: "N",
    current_token: "address.street.primary.name.streetName"
    },
    {
        address.street.primary.number.houseNumber: "620",
        address.street.primary.name.streetPrefix: "N",
    current_token: "address.street.primary.name.streetPrefix"
    },
}
```

Beginning with the first ranked parse, the search engine 128 queries where country="US", houseNumber="620", and streetName begins with "N". Results are grouped, ordered by count, and the top six are selected to send back to the cleanse engine 120.

```
{
    addr_search_results: [6]
    {
        address.street.primary.name.streetName: "NOTTINGHAM",
        address.street.primary.name.streetType: "BOULEVARD",
        address.street.primary.number.houseNumber: "620"
    },
    {
```

-continued

```
        address.street.primary.name.streetName: "NORTH",
        address.street.primary.name.streetType: "AVENUE",
        address.street.primary.number.houseNumber: "6200"
    },
    {
        address.street.primary.name.streetName: "NARROW",
        address.street.primary.name.streetType: "LANE",
        address.street.primary.number.houseNumber: "620"
    },
    ...
}
```

The cleanse engine 120 performs basic standardization and sends candidates back to the application 126.

```
{
    std_addr_country_2char: "US",
    addr_search_status: "0",
        addr_search_results: [6]
        {
            result: "620 Nottingham Blvd",
            country: "US",
                street: "Nottingham Blvd",
            house_num: "620",
            house_num2: "",
            locality: "",
            region: "",
            postcode: ""
        },
        {
            result: "620 North Ave",
            country: "US",
                mixed: "North Ave",
            house_num: "620",
            house_num2: "",
            locality: "",
            region: "",
            postcode: ""
        },
        {
            result: "620 Narrow Ln",
            country: "US",
                mixed: "Narrow Ln",
            house_num: "620",
            house_num2: "",
            locality: "",
            region: "",
            postcode: ""
        },
        ...
}
```

Figure 3S:
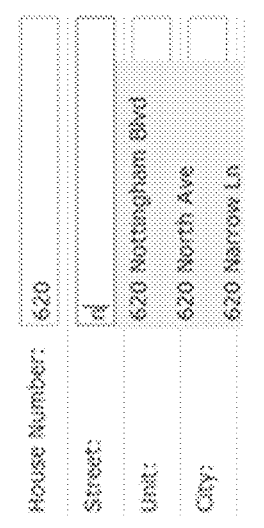

The application 126 displays the candidate list to the user as shown at FIG. 3S.

The process continues the same as the "United States street address" scenario.

Scenario (Variation): Suggestion Lists

Complete address desired by user: 620 N Lake Shore Dr Ste 201, Chicago Ill. 60611.

The process is the same as the "United States street address" scenario for the whole process of searching and validating the delivery address, but what differs with this scenario is that there is additional address data available in the reference data. In this scenario it is unit information, but in other countries the additional data may be building name, floor number, block number, or other components.

Because both keystroke search and suggestion lists are enabled in the configuration, when the user selects a candidate from the list the application 126 needs to look at both the addr_search_status and the addr_sugg_status to know what action to take.

Example

Figure 3T:
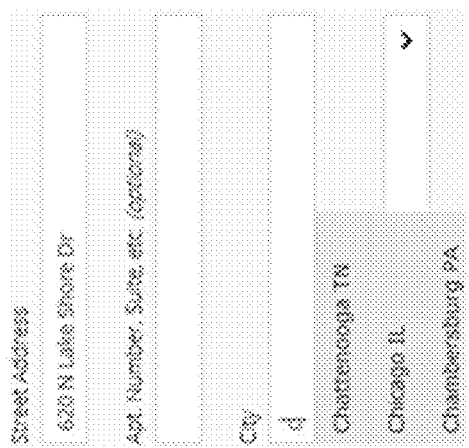

Say the interaction with the user is at the final step of selecting the city, in which addr_search_status="1". Once the user selects the desired city, the application 126 sends another request to finalize the address (FIG. 3T).

Data sent from the application 126 to the cleanse engine 120.

```
{
    country: "US",
    mixed: "620 N Lake Shore Dr",
    locality: "Chicago",
    region: "IL",
    current_field: "locality"
}
```

The cleanse engine 120 parses the data, and performs its normal address cleansing process (without sending anything to the search engine 128) and in its lookups detects that there is secondary data available. It returns a fully cleansed address to the application 126, still with addr_search_status="2", but this time with suggestion list data.

Note that in each of the previous returns the addr_sugg_status="N" for each keystroke. This time the cleanse engine 120 utilizes the suggestion list module instead of the search engine 128.

```
{
    addr_search_status: "2",
    std_addr_country_2char: "US",
        std_addr_prim_address: "620 N Lake Shore Dr",
        std_addr_sec_address: "",
        std_addr_locality_full: "Chicago",
        std_addr_region_full: "IL",
        std_addr_postcode_full: "60611-4025",
    addr_sugg_count: "3",
    addr_sugg_status: "S",
    addr_sugg_error: "1",
    addr_sugg_list: [4]
        {
            sugg_addr_selection: "1",
            sugg_addr_address_delivery: "620 N LAKE SHORE DR, STE 100",
            sugg_addr_lastline: "CHICAGO, IL, 60611",
            sugg_addr_prim_number_low: "620",
            sugg_addr_prim_number_high: "620",
            sugg_addr_prim_side_indicator: "E",
            sugg_addr_unit_number_low: "100",
            sugg_addr_unit_number_high: "100",
            sugg_addr_sec_side_indicator: "E"
        }
        {
            sugg_addr_selection: "2",
            sugg_addr_address_delivery: "620 N LAKE SHORE DR, STE 200",
            sugg_addr_lastline: "CHICAGO, IL, 60611",
            sugg_addr_prim_number_low: "620",
            sugg_addr_prim_number_high: "620",
            sugg_addr_prim_side_indicator: "E",
            sugg_addr_unit_number_low: "200",
            sugg_addr_unit_number_high: "200",
            sugg_addr_sec_side_indicator: "E"
        }
        {
            sugg_addr_selection: "3",
            sugg_addr_address_delivery: "620 N LAKE SHORE DR, STE 201",
            sugg_addr_lastline: "CHICAGO, IL, 60611",
            sugg_addr_prim_number_low: "620",
            sugg_addr_prim_number_high: "620",
            sugg_addr_prim_side_indicator: "E",
            sugg_addr_unit_number_low: "201",
            sugg_addr_unit_number_high: "201",
            sugg_addr_sec_side_indicator: "O"
        }
        {
            sugg_addr_selection: "4",
            sugg_addr_address_delivery: "620 N LAKE SHORE DR, STE 300-320",
            sugg_addr_lastline: "CHICAGO, IL, 60611",
            sugg_addr_prim_number_low: "620",
            sugg_addr_prim_number_high: "620",
            sugg_addr_prim_side_indicator: "E",
            sugg_addr_unit_number_low: "300",
            sugg_addr_unit_number_high: "320",
            sugg_addr_sec_side_indicator: "E"
        }
}
```

Figure 3U:
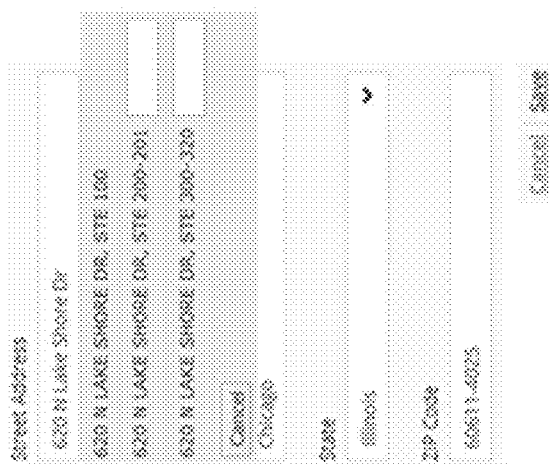

With addr_search_status="2", the application 126 enables the "Save" button, but also displays the entries in the suggestion list in the event the user chooses to enter the secondary data (FIG. 3U).

When the user selects the desired suggestion from the list, the application 126 sends the data to the cleanse engine 120. Notice the following points.

The request does not include the current field attribute. This attribute is used only in search, and with addr_search_status="2" the search engine 128 will not be used. This attribute may be sent, but it will be ignored by the cleanse engine 120 when nothing is sent to the search engine 128.

The request includes the suggestion_reply attribute, indicating which suggestion the user selected. The suggestion_reply attribute is necessary only when suggestion lists is enabled.

When the user selects a suggestion with a single entry, such as the first suggestion above "STE 100", then the suggestion_reply attribute is sent with that selection.

```
{
    country: "US",
    mixed: "620 N LAKE SHORE DR, STE 201",
    locality: "Chicago",
    region: "IL",
    suggestion_reply: [1]
}
```

When the user selects a suggestion with a ranged entry, such as the second suggestion above "STE 200-201", then the suggestion_reply attribute is sent with the selection, and the actual suite number that the user types in the text field.

```
{
    country: "US",
    mixed: "620 N LAKE SHORE DR, STE 201",
    locality: "Chicago",
    region: "IL",
    suggestion_reply: [2,201]
}
```

The cleanse engine 120 parses the data, and performs its normal address cleansing process, without sending anything to the search engine 128, and without detecting additional data is available. The application 126 returns a fully cleansed address to the application 126, in the form of the attributes selected in the request.

```
{
    addr_search_status: "2",
    std_addr_country_2char: "US",
```

```
    std_addr_prim_address: "620 N Lake Shore Dr",
    std_addr_sec_address: "Ste 201",
    std_addr_locality_full: "Chicago",
    std_addr_region_full: "IL",
    std_addr_postcode_full: "60611-4025",
    addr_sugg_count: "0",
    addr_sugg_status: "N",
    addr_sugg_error: "0"
}
```

With addr_search_status="2" and addr_sugg_status="N", the application 126 now populates the fields with the validated, corrected data (FIG. 3V).

Scenario: SAP Business Suite

Figure 3W:
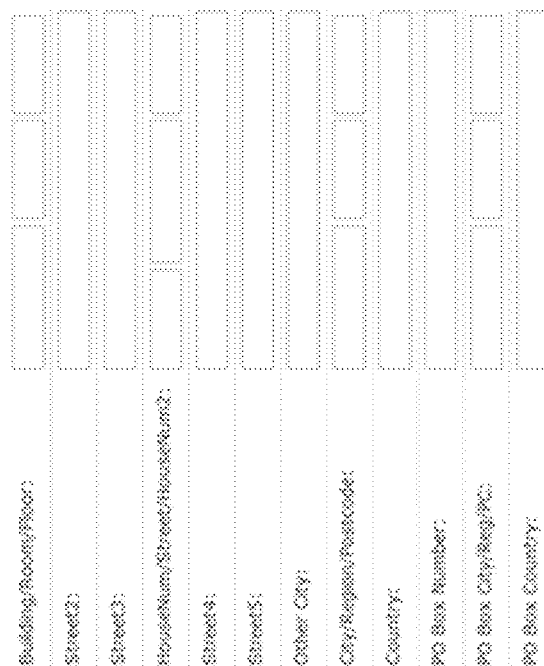

The SAP Business Suite data model consists of a very specific set of fields to store address data. It allows for an individual record to have two addresses, one for the street address and one for the postbox address. The web form for displaying the address data looks something like the following (FIG. 3W).

Say the complete street address desired by user is the same as the "United States street address" scenario: 620 N Lake Shore Dr, Chicago Ill. 60611, and the complete postbox address is PO Box 800, Chicago Ill. 60690.

Street Address

The street address in the SAP Business Suite is stored in a complex set of discrete fields. However, it does not matter whether the fields exposed to the user are simple or complex. The cleanse engine 120 handles the parsing of data entered so far into parsed components, and sends the ranked possible parses in a consistent way to the search engine 128 independent of the fields exposed to the user.

Two points in the process will be shown to illustrate the process of the user entering the same address into this complex street address format.

Say the user is at the point of entering "620 N Lake Shor". Notice how the data sent from the application 126 to the cleanse engine 120, and sent from the cleanse engine 120 back to the application 126, involves different fields than those in the first scenario, but the data sent from the cleanse engine 120 to the search engine 128, and sent from the search engine 128 back to the cleanse engine 120, is the same.

The process continues with each character entered by the user. Now skip to where the user enters almost the entire street name. It is common for this to happen when the street name is common to many cities in the country.

Data sent from the application 126 to the cleanse engine 120.

```
{
    country: "US",
    street: "n lake shor",
    house_num: "620",
    house_num2: "",
    floor: "",
    roomnumber: "",
    building: "",
    str_suppl: "",
    str_suppl2: "",
    str_suppl3: "",
    location: "",
    locality: "",
    locality2: "",
    locality3: "",
    region: "",
    postcode: "",
```

```
    current_field: "street"
}
```

The cleanse engine 120 parses the data, identifies that it is too incomplete to validate the address, and sends parsed data to the search engine 128.

```
{
country: "US",
    addr_search:
        {
            address.street.primary.number.houseNumber: "620",
            address.street.primary.name.streetPrefix: "N",
            address.street.primary.name.streetName: "LAKE SHOR",
        current_token: "address.street.primary.name.streetName"
        },
}
```

The search engine 128 queries where country="US", houseNumber="620", streetPrefix="N", and streetName begins with "LAKE SHOR". Results are grouped, ordered by count, and the top six are selected to send back to the cleanse engine 120.

```
{
    addr_search_results: [6]
        {
            address.street.primary.name.streetName: "LAKE SHORE",
            address.street.primary.name.streetType: "STREET",
            address.street.primary.name.streetPrefix: "NORTH",
            address.street.primary.number.houseNumber: "620"
        },
        {
            address.street.primary.name.streetName: "LAKE SHORE",
            address.street.primary.name.streetType: "ROAD",
            address.street.primary.name.streetPrefix: "NORTH",
            address.street.primary.number.houseNumber: "620"
        },
        {
            address.street.primary.name.streetName: "LAKE SHORE",
            address.street.primary.name.streetType: "DRIVE",
            address.street.primary.name.streetPrefix: "NORTH",
            address.street.primary.number.houseNumber: "620"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "N Lake Shore St",
                country: "US",
                street: "N Lake Shore St",
                house_num: "620",
                house_num2: "",
                floor: "",
                roomnumber: "",
                building: "",
                str_suppl: "",
                str_suppl2: "",
                str_suppl3: "",
                location: "",
                locality: "",
                locality2: "",
                locality3: "",
```

```
        region: "",
        postcode: "",
    },
    {
        result: "N Lake Shore Rd",
        country: "US",
        street: "N Lake Shore Rd",
        house_num: "620",
        house_num2: "",
        floor: "",
        roomnumber: "",
        building: "",
        str_suppl: "",
        str_suppl2: "",
        str_suppl3: "",
        location: "",
        locality: "",
        locality2: "",
        locality3: "",
        region: "",
        postcode: "",
    },
    {
        result: "N Lake Shore Dr",
        country: "US",
        street: "N Lake Shore Dr",
        house_num: "620",
        house_num2: "",
        floor: "",
        roomnumber: "",
        building: "",
        str_suppl: "",
        str_suppl2: "",
        str_suppl3: "",
        location: "",
        locality: "",
        locality2: "",
        locality3: "",
        region: "",
        postcode: "",
    },
    ...
}
```

Figure 3X:
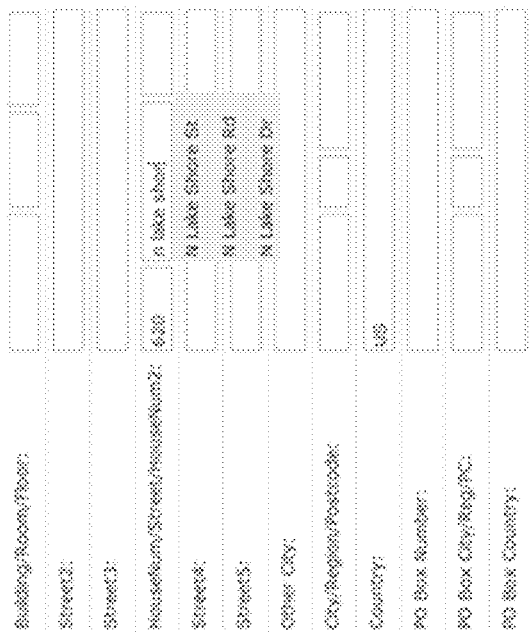

The application 126 displays the candidate list to the user (FIG. 3X).

Figure 3Y:
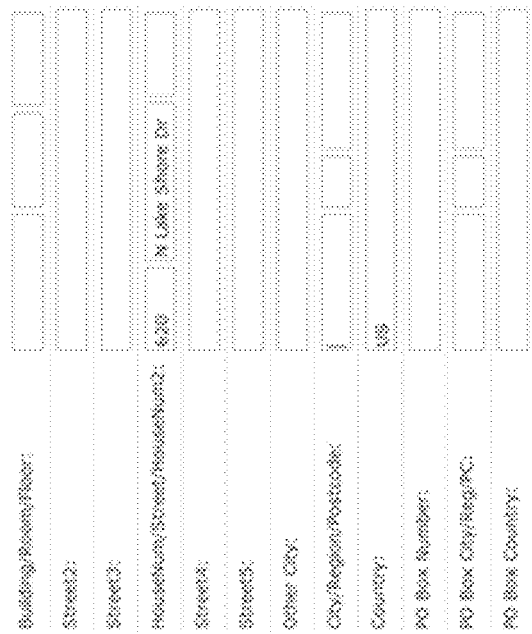
Figure 32:
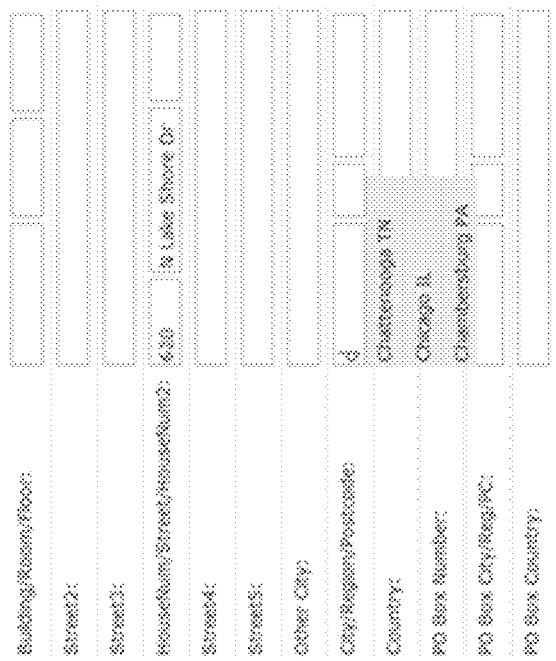

The user sees the desired address and selects "620 Lake Shore Dr" (FIG. 3Y). Now the application 126 looks at the search status code to see what action to take. Because addr_search_status="0" the application 126 overwrites fields with the non-display attributes, in this case mixed, and waits for more user action.

Now the user enters the City field, and say we skip to the point where the user enters the C.

Data sent from the application 126 to the cleanse engine 120.

```
{
    country: "US",
    street: "N Lake Shore Dr",
    house_num: "620",
    house_num2: "",
    floor: "",
    roomnumber: "",
    building: "",
    str_suppl: "",
    str_suppl2: "",
    str_suppl3: "",
    location: "",
    locality: "c",
    locality2: "",
    locality3: "",
    region: "",
    postcode: "",
```

```
    current_field: "locality"
}
```

The cleanse engine 120 parses the data, identifies that it is too incomplete to validate the address, and sends parsed data to the search engine 128.

```
{
country: "US",
    addr_search:
    {
        address.street.primary.number.houseNumber: "620",
        address.street.primary.name.streetPrefix: "N",
        address.street.primary.name.streetName: "LAKE SHORE",
        address.street.primary.name.streetType: "DR",
        address.cityRegionPostcode.city: "C",
    current_token: "address.cityRegionPostcode.city"
    },
}
```

The search engine 128 queries localities where country="US", houseNumber="620", streetPrefix="N", streetName="LAKE SHORE", streetType="DR", and city begins with "C".

```
{
    addr_search_results: [3]
    {
        address.cityStateRegion.city: "CHATTENOOGA",
        address.cityStateRegion.region: "TN"
    },
    {
        address.cityStateRegion.city: "CHICAGO",
        address.cityStateRegion.region: "IL"
    },
    {
        address.cityStateRegion.city: "CHAMBERSBURG",
        address.cityStateRegion.region: "PA"
    },
}
```

The cleanse engine 120 performs basic standardization and sends candidates back to the application 126.

```
{
    std_addr_country_2char: "US",
    addr_search_status: "1",
        addr_search_results: [3]
        {
            result: "Chattenooga TN",
            country: "US",
            street: "N Lake Shore Dr",
            house_num: "620",
            house_num2: "",
            floor: "",
            roomnumber: "",
            building: "",
            str_suppl: "",
            str_suppl2: "",
            str_suppl3: "",
            location: "",
            locality: "Chattenooga",
            locality2: "",
            locality3: "",
            region: "TN",
            postcode: "",
        },
        {
            results: "Chicago IL",
            country: "US",
            street: "N Lake Shore Dr",
```

```
            house_num: "620",
            house_num2: "",
            floor: "",
            roomnumber: "",
            building: "",
            str_suppl: "",
            str_suppl2: "",
            str_suppl3: "",
            location: "",
            locality: "Chicago",
            locality2: "",
            locality3: "",
            region: "IL",
            postcode: "",
        },
        {
            result: "Chambersburg PA",
            country: "US",
            street: "N Lake Shore Dr",
            house_num: "620",
            house_num2: "",
            floor: "",
            roomnumber: "",
            building: "",
            str_suppl: "",
            str_suppl2: "",
            str_suppl3: "",
            location: "",
            locality: "Chambersburg",
            locality2: "",
            locality3: "",
            region: "PA",
            postcode: "",
        },
        ...
}
```

The application 126 displays the candidate list to the user (FIG. 3Z).

The user sees the desired city and selects it. Now the application 126 looks at the search status code to see what action to take. Because addr_search_status="1" the application 126 sends another request to finalize the address.

Data sent from the application 126 to the cleanse engine 120.

```
{
    country: "US",
    street: "N Lake Shore Dr",
    house_num: "620",
    house_num2: "",
    floor: "",
    roomnumber: "",
    building: "",
    str_suppl: "",
    str_suppl2: "",
    str_suppl3: "",
    location: "",
    locality: "Chicago",
    locality2: "",
    locality3: "",
    region: "IL",
    postcode: "",
    current_field: "locality"
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
    addr_search_status: "2",
    std_addr_country_2char: "US",
        std_addr_prim_name1_4: "N Lake Shore Dr",
        std_addr_prim_number_full: "620",
        std_addr_secaddr_no_floor_room: "",
        std_addr_floor_number: "",
        std_addr_room_number: "",
        std_addr_building_name: "",
        std_addr_building_name2: "",
        addr_remainder_extra_pmb_full: "",
        std_addr_point_of_ref1_2: "",
        std_addr_locality_full: "Chicago",
        std_addr_locality2_full: "",
        std_addr_locality3_4_full: "",
        std_addr_region_full: "IL",
        std_addr_postcode_full: "60611-4025"
}
```

Figure 4A:
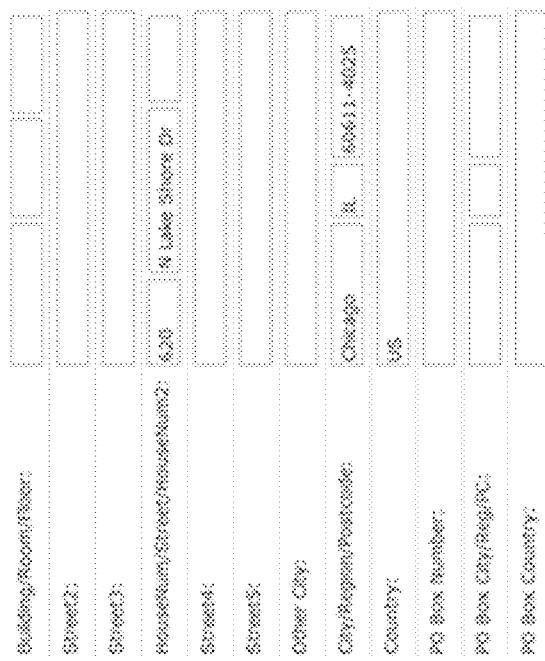

With addr_search_status="2", the application 126 now populates the fields with the validated, corrected data (FIG. 4A). It may also enable the "Save" button, "Next" button, or whatever the next action is for the end user in the form.

Postbox Address

Now that the street address is complete the user enters the PO Box Number field and begins typing, beginning with "8". The application 126 now sends only the postbox address set of fields.

Data sent from the application 126 to the cleanse engine 120.

```
{
    po_box_country: "US",
    po_box: "8",
    po_box_locality: "",
    po_box_region: "",
    po_box_postcode: "",
    current_field: "mixed"
}
```

The cleanse engine 120 behaves differently because the "8" is sent in the po_box field as opposed to the mixed field. It has the intelligence to know this number refers to a postbox address and therefore does not assume it refers to a house number for the first two digits. In addition, because the application 126 is sending data using the SAP Business Suite data model fields, the cleanse engine 120 has the knowledge of the normal act of the street address and the postbox address sharing the same city information. While this is not a requirement, it is the normal situation.

Therefore, the cleanse engine 120 performs its own reference data lookups for a postbox with the number "8" in Chicago, without sending anything to the search engine 128. It performs basic standardization on the results and sends the candidate back to the application 126. Notice that addr_search_status="1" because this is an address that can be finalized if the user selects it.

```
{
    std_addr_country_2char: "US",
    addr_search_status: "1",
        addr_search_results: [1]
        {
            result: "PO Box 8, Chicago IL 60690",
            po_box_country: "US",
            po_box: "8",
            po_box_locality: "Chicago",
            po_box_region: "IL",
            po_box_postcode: "60690"
```

-continued

```
        }
    }
```

Figure 4B:
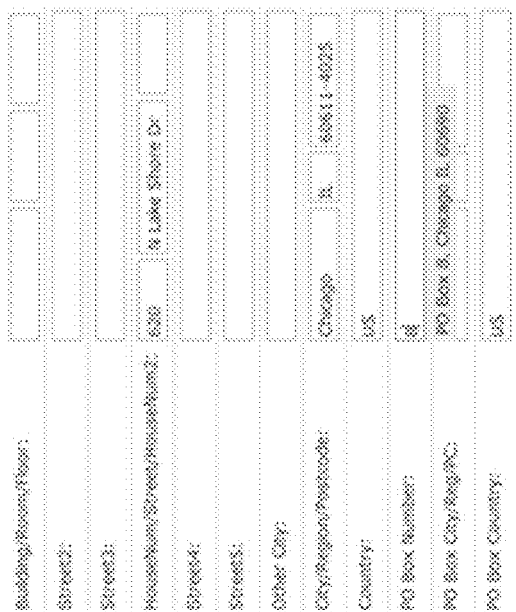

The application 126 displays the candidate to the user (FIG. 4B).

The user does not see the desired address and therefore continues typing. The same process continues for the second and third keystroke.

Now say the user is at the third keystroke, entering "800" in the PO Box Number field. After the "800" is sent to the cleanse engine 120, and the intelligent lookup is performed without sending to the search engine 128, the candidate is sent back to the application 126. The addr_search_status continues to be "1" because this is an address that can be finalized if the user selects it.

```
{
    std_addr_country_2char: "US",
    addr_search_status: "1",
        addr_search_results: [1]
        {
            result: "PO Box 800, Chicago IL 60690",
            po_box_country: "US",
            po_box: "8",
            po_box_locality: "Chicago",
            po_box_region: "IL",
            po_box_postcode: "60690"
        }
}
```

Figure 4C:
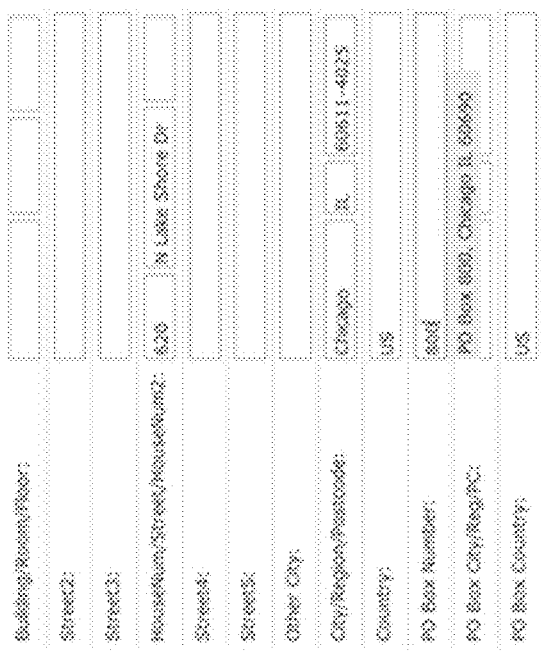

The application 126 displays the candidate to the user (FIG. 4C).

The user sees the desired postbox address and selects it. With addr_search_status="1" the application 126 sends another request to finalize the address.

Data sent from the application 126 to the cleanse engine 120.

```
{
    po_box_country: "US",
    po_box: "PO Box 800",
    po_box_locality: "Chicago",
    po_box_region: "IL",
    po_box_postcode: "60690",
    current_field: "po_box"
}
```

The cleanse engine 120 parses the data and performs its normal address cleansing process (without sending anything to the search engine 128). The attributes returned are the attributes selected in the request.

```
{
    addr_search_status: "2",
    std_addr_po_box_country_2char: "US",
        std_addr_po_box_number: "800",
        std_addr_po_box_locality_full: "Chicago",
        std_addr_po_box_region_full: "IL",
        std_addr_po_box_postcode_full: "60690-0800"
}
```

Figure 4D:
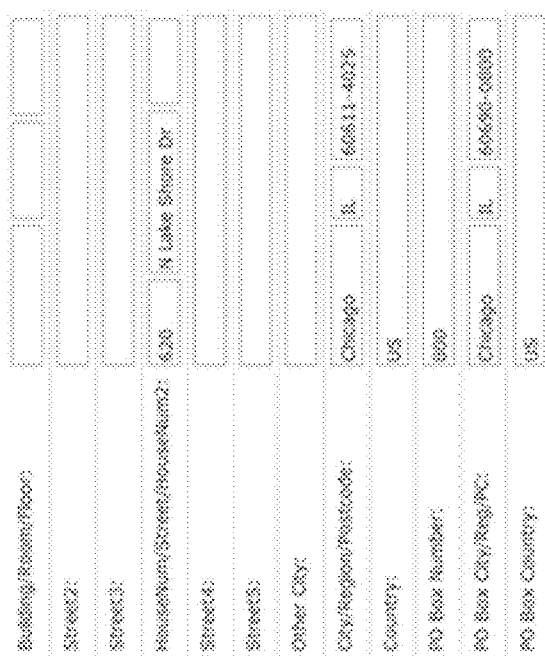

With addr_search_status="2", the application 126 now populates the fields with the finalized cleansed data (FIG. 4D).

Scenario: United Kingdom building address

Complete address desired by user: International House, 16 Stukeley St, London WC2B 5QL.

Figure 4E:
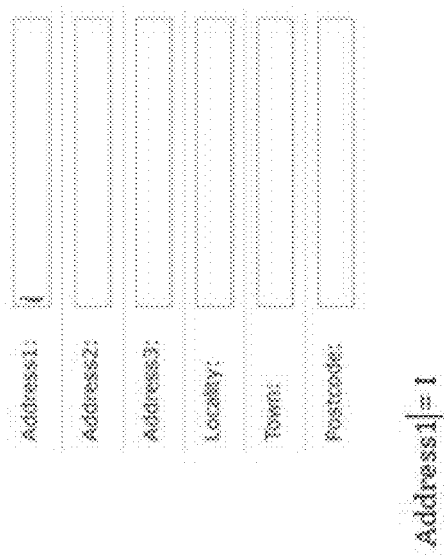

The user begins by typing the first character "I" into the Address field (FIG. 4E).

Data sent from the application 126 to the cleanse engine 120.

```
{
    country: "GB",
    mixed: "i",
    mixed2: "",
    mixed: "",
    locality2: "",
    locality: "",
    postcode: "",
    current_field: "mixed"
}
```

The cleanse engine 120 parses the data, identifies that it is too incomplete to validate the address, and therefore sends parsed data to the search engine 128. For the first two characters only the single parse of street name is sent.

```
    }
    country: "GB",
        addr_search:
        {
            address.street.primary.name.streetName: "I",
            current_token: "address.street.primary.name.streetName"
        }
}
```

The search engine 128 queries where country="GB" and streetName begins with "I". Results are grouped, ordered by count, and the top six are selected to send back to the cleanse engine 120.

```
{
    addr_search_results: [6]
    {
        address.street.primary.name.streetName: "IVES",
        address.street.primary.name.streetType: "LANE",
    },
    {
        address.street.primary.name.streetName: "IPSWITCH",
        address.street.primary.name.streetType: "STREET",
    },
    {
        address.street.primary.name.streetName: "INWOOD",
        address.street.primary.name.streetType: "AVENUE",
    },
    ...
}
```

The cleanse engine 120 performs basic standardization and sends candidates back to the application 126.

```
{
    std_addr_country_2char: "GB",
    addr_search_status: "0",
        addr_search_results: [6]
        {
            result: "Ives Lane",
            country: "GB",
                mixed: "Ives Lane",
            mixed2: "",
                mixed3: "",
            locality: "",
            locality2: "",
            postcode: ""
        },
        {
```

-continued

```
        result: "Ipswitch Street",
        country: "GB",
            mixed: "Ipswitch Street",
        mixed2: "",
            mixed3: "",
        locality: "",
        locality2: "",
        postcode: ""
    },
    {
        result: "Inwood Avenue",
        country: "GB",
            mixed: "Inwood Avenue",
        mixed2: "",
            mixed3: "",
        locality: "",
        locality2: "",
        postcode: ""
    },
    ...
}
```

Figure 4F:
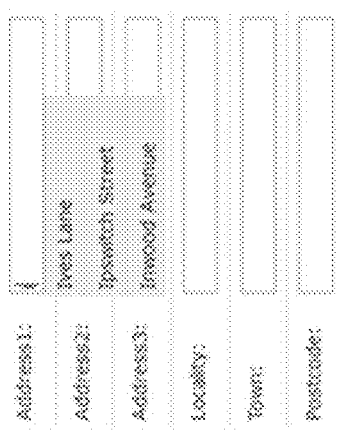

The application 126 displays the candidates to the user. The user may select one of the addresses from the list, or may ignore the list and keep typing (FIG. 4F).

None of the addresses displayed is the desired address, and so the user types the next character.

Address1=IN

With two characters the action is the same as with one character. The rudimentary parse limits the search to street names.

Address1=INT

With three characters the cleanse engine 120 opens up to include multiple parses.

Data sent from the application 126 to the cleanse engine 120.

```
{
    country: "GB",
    mixed: "int",
    mixed2: "",
    mixed3: "",
    locality: "",
    locality2: "",
    postcode: "",
    current_field: "mixed"
}
```

The cleanse engine 120 parses the data, identifies that it is too incomplete to validate the address, and sends parsed data to the search engine 128. Notice that the cleanse engine 120 identifies two possible parses, ranking them in order of probability.

```
{
    country: "GB",
        addr_search:
        {
            address.street.primary.name.streetName: "INT",
            current_token: "address.street.primary.name.streetName"
        },
        {
            address.street.building: "INT",
            current_token: "address.street.building"
        },
}
```

Beginning with the first ranked parse, the search engine 128 queries where country="GB" and streetName begins with "INT". It queries the second ranked parse only if there are less than six records in the result set.

Address1=INTERNATIONA

The process continues with each character entered by the user. Now skip to where the user enters more characters of the building name.

Data sent from the application 126 to the cleanse engine 120.

```
{
    country: "GB",
    mixed: "internationa",
    mixed2: "",
    mixed3: "",
    locality: "",
    locality2: "",
    postcode: "",
    current_field: "mixed"
}
```

The cleanse engine 120 parses the data, identifies that it is too incomplete to validate the address, and sends parsed data to the search engine 128.

```
{
    country: "GB",
        addr_search:
        {
            address.street.primary.name.streetName: "INTERNATIONA",
            current_token: "address.street.primary.name.streetName"
        },
        {
            address.street.building: "INTERNATIONA",
            current_token: "address.street.building"
        },
}
```

Beginning with the first ranked parse, the search engine 128 queries where country="GB" and streetName begins with "INTERNATIONA". There are less than six results, and therefore it uses the second ranked parse to query where country='GB" and building begins with "INTERNATIONA". Results are grouped, ordered by count, and the top six are selected to send back to the cleanse engine 120.

Notice that the result has a combination of the two parses.

```
{
    addr_search_results: [6]
    {
        address.street.primary.name.streetName: "INTERNATIONAL",
        address.street.primary.name.streetType: "LANE",
    },
    {
        address.street.building: "INTERNATIONAL STUDENTS HOUSE",
    },
    {
        address.street.building: "INTERNATIONAL CAPITAL BUILDING",
    },
    {
        address.street.building: "INTERNATIONAL HOUSE",
    },
    ...
}
```

The cleanse engine 120 performs basic standardization and sends candidates back to the application 126.

```
{
    std_addr_country_2char: "GB",
    addr_search_status: "0",
        addr_search_results: [6]
            {
                result: "International Lane",
                country: "GB",
                    mixed: "International Lane",
                mixed2: "",
                    mixed3: "",
                locality: "",
                locality2: "",
                postcode: ""
            },
            {
                result: "International Students House",
                country: "GB",
                    mixed: "International Students House",
                mixed2: "",
                    mixed3: "",
                locality: "",
                locality2: "",
                postcode: ""
            },
            {
                result: "International Capital Building",
                country: "GB",
                    mixed: "International Capital Building",
                mixed2: "",
                    mixed3: "",
                locality: "",
                locality2: "",
                postcode: ""
            },
            {
                result: "International House",
                country: "GB",
                    mixed: "International House",
                mixed2: "",
                    mixed3: "",
                locality: "",
                locality2: "",
                postcode: ""
            },
            ...
}
```

Figure 4G:
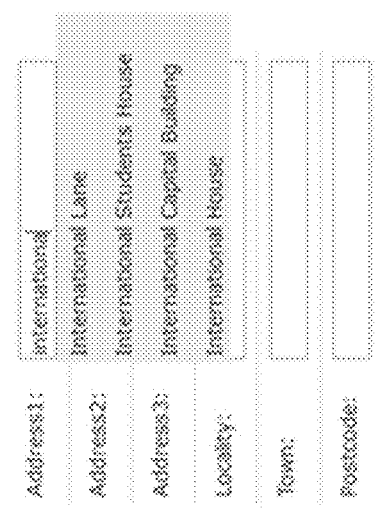

The application 126 displays the candidates to the user (FIG. 4G).

Figure 4H:
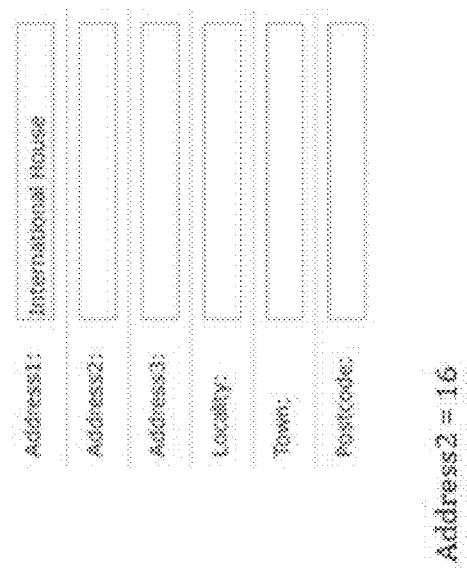
Figure 41:
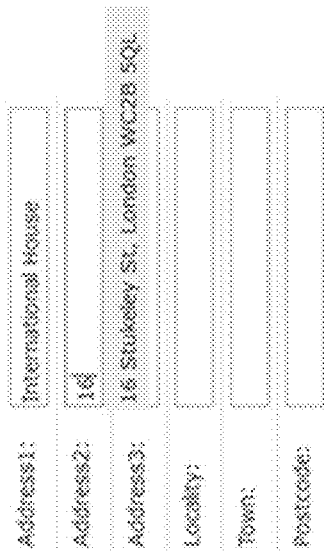

The user sees the desired building name and selects it. Because there are multiple "International House" addresses in the United Kingdom, the addr_status_code="0". The application 126 can overwrite the Address1 field with the full building name, but it cannot yet send the data to the cleanse engine 120 to be finalized (FIG. 4H).

Now the user begins to type in the Address2 field. The process is the same for the first two characters, so skip to where the user enters "16".

Data sent from the application 126 to the cleanse engine 120.

```
{
    country: "GB",
    mixed: "International House",
    mixed2: "16",
    mixed3: "",
    locality: "",
    locality2: "",
    postcode: "",
    current_field: "mixed2"
}
```

The cleanse engine 120 parses the data, identifies that it is too incomplete to validate the address, and sends parsed data to the search engine 128.

```
{
    country: "GB",
        addr_search:
        {
            address.street.building: "INTERNATIONAL HOUSE",
            address.street.primary.number.houseNumber: "INT",
            current_token: "address.street.primary.number.houseNumber"
        },
}
```

The search engine 128 queries where country="GB", building="INTERNATIONAL HOUSE", and houseNumber begins with "16". Say that for all of the buildings with this name in the United Kingdom only one of them has a house number that begins with "16". The single result is sent back to the cleanse engine 120.

Notice that the search engine 128 does a "begins with" search for the house number. This is different than the "United States street address" scenario. In the previous scenario, the number was the first data entered, and therefore the search engine 128 does an "equals" search for the house number. But in this scenario, the number is not the first data entered, and therefore the search engine 128 does a "begins with" search.

```
{
    addr_search_results: [1]
        {
            address.street.building: "INTERNATIONAL HOUSE",
            address.street.primary.number.houseNumber: "16",
            address.street.primary.name.streetName: "STUKELEY",
            address.street.primary.name.streetType: "STREET",
            address.cityRegionPostcode.city: "LONDON",
            address.cityRegionPostcode.postcode: "WC2B 5QL",
        },
}
```

The cleanse engine 120 performs basic standardization and sends the single candidate back to the application 126. Notice that addr_search_status="1" because this is an address that can be finalized if the user selects it.

```
{
    std_addr_country_2char: "GB",
    addr_search_status: "1",
        addr_search_results: [1]
            {
                result: "16 Stukeley St, London WC2B 5QL",
                country: "GB",
                    mixed: "International House",
                mixed2: "16 Stukeley St",
                    mixed3: "",
                locality: "London",
                locality2: "",
                postcode: "WC2B 5QL"
            }
}
```

The application 126 displays the single candidate to the user (FIG. 4I).

The user sees the desired city and selects it. Now the application 126 looks at the search status code to see what action to take. Because addr_search_status="1" the application 126 sends another request to finalize the address.

Full Address Match

Data sent from the application 126 to the cleanse engine 120.

```
{
country: "GB",
mixed: "International House",
mixed2: "16 Stukeley St",
mixed3: "",
locality: "London",
locality2: "",
postcode: "WC2B 5QL",
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
addr_search_status: "2",
std_addr_country_2char: "GB",
    std_addr_building_name: "International House",
    std_addr_address_delivery: "16 Stukeley St",
    std_addr_locality3_full: "",
    std_addr_locality2_full: "",
    std_addr_locality_full: "London",
    std_addr_postcode_full: "WC2B 5QL"
}
```

With addr_search_status="2", the application 126 now populates the fields with the validated, corrected data (FIG. 4J).

Scenario (Variation): Rare Building Name

Complete address desired by user: International Students House, 229 Great Portland St, London W1 W 5PN.

This scenario is the same as the "United Kingdom building address" scenario, but the difference is that when the user selects a building name from the candidate list there is only one building in the country with that name. Therefore, the search engine 128 returns a full address.

Example

Figure 4K:
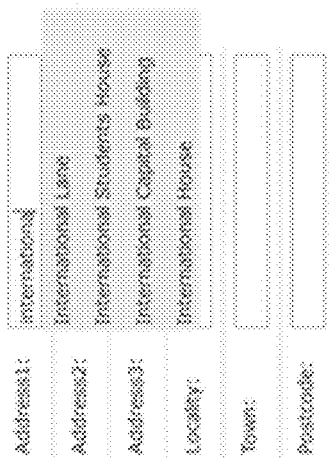

Say the interaction with the user is at the step of having entered "internationa", and the following list of streets and buildings are returned in the candidate list (FIG. 4k).

The user sees the desired building and selects it, then enters the Address2 field.

If the configuration setting is enabled to perform a search in a subsequent field before entering data, as soon as the user enters the Address2 field the application 126 sends the previously selected address data, this time with Address2 as the current field.

Data sent from the application 126 to the cleanse engine 120.

```
{
country: "GB",
mixed: "International Students House",
mixed2: "",
mixed3: "",
locality: "",
locality2: "",
postcode: "",
current_field: "mixed2"
}
```

The cleanse engine 120 parses the data, identifies that it is too incomplete to validate the address, and sends parsed data to the search engine 128.

```
{
country: "GB",
    addr_search:
    {
        address.street.building: "INTERNATIONAL STUDENTS HOUSE",
        address.street.primary.number.houseNumber: "",
    current_token: "address.street.primary.number.houseNumber"
    },
}
```

The search engine 128 queries where country="GB" and building="INTERNATIONAL STUDENTS HOUSE". Say that there is only one building with this name in the United Kingdom, therefore the full address for the building is sent back to the cleanse engine 120.

```
{
    addr_search_results: [1]
    {
        address.street.building: "INTERNATIONAL STUDENTS HOUSE",
        address.street.primary.number.houseNumber: "229",
        address.street.primary.name.streetName: "GREAT PORTLAND",
        address.street.primary.name.streetType: "STREET",
        address.cityRegionPostcode.city: "LONDON",
        address.cityRegionPostcode.postcode: "W1W 5PN",
    },
}
```

The cleanse engine 120 performs basic standardization and sends the single candidate back to the application 126. Notice that addr_search_status="1" because this is an address that can be finalized if the user selects it.

```
{
std_addr_country_2char: "GB",
addr_search_status: "1",
    addr_search_results: [1]
    {
        result: "229 Great Portland St, London W1W 5PN",
    country: "GB",
        mixed: "International Students House",
    mixed2: "229 Great Portland St",
        mixed3: "",
    locality: "London",
    locality2: "",
    postcode: "W1W 5PN"
    }
}
```

Figure 4L:
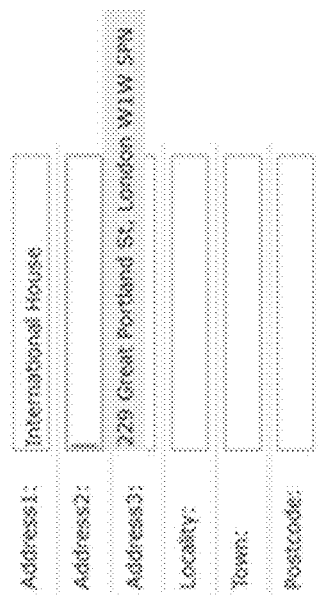

The application 126 displays the single candidate to the user (FIG. 4L).

The process continues the same as the "United Kingdom building address" scenario.

Scenario: Street Before House Number

Complete address in Germany desired by user: Griegstraße 95, 22763 Hamburg.

Figure 4M:
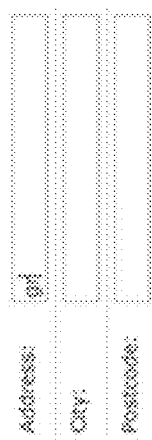

The user begins by typing into the Address field (FIG. 4M).

In this scenario the cleanse engine 120 knows that the country is Germany, and that in Germany the normal order of components in street address is street name+street type+house number. Therefore, there are some things to point out in this scenario that are different than the "United States street address" and "United Kingdom building address" scenarios.

Address=CR

The first difference to point out is that the first characters typed are alpha.

Data sent from the application 126 to the cleanse engine 120.

```
{
    country: "DE",
    mixed: "gr",
    locality: "",
    postcode: "",
    current_field: "mixed"
}
```

The cleanse engine 120 parses the data, identifies that it is too incomplete to validate the address, and therefore sends parsed data to the search engine 128. For the first two characters the single parse is street name for alpha characters.

```
{
    country: "DE",
        addr_search:
        {
            address.street.primary.name.streetName: "GR",
            current_token: "address.street.primary.name.streetName"
        }
}
```

The search engine 128 queries where country="DE" and streetName begins with "GR". Results are grouped, ordered by count, and the top six are selected to send back to the cleanse engine 120.

```
{
    addr_search_results: [6]
    {
        address.street.primary.name.streetName: "GROßE",
        address.street.primary.name.streetType: "STRAßE"
    },
    {
        address.street.primary.name.streetName: "GRABEN",
        address.street.primary.name.streetType: "STRAßE"
    },
    {
        address.street.primary.name.streetName: "GRÜNER",
        address.street.primary.name.streetType: "WEG"
    },
    ...
}
```

The cleanse engine 120 performs basic standardization and sends candidates back to the application 126.

```
{
    std_addr_country_2char: "DE",
    addr_search_status: "0",
        addr_search_results: [6]
        {
            result: "Großestraße",
            country: "DE",
                mixed: "Großestraße",
            locality: "",
            postcode: ""
        },
        {
            result: "Graßenstraße",
            country: "DE",
                mixed: "Graßenstraße",
            locality: "",
            postcode: ""
        },
        {
            result: "Grünerweg",
            country: "DE",
                mixed: "Grünerweg",
            locality: "",
            postcode: ""
        },
        ...
}
```

Figure 4N:
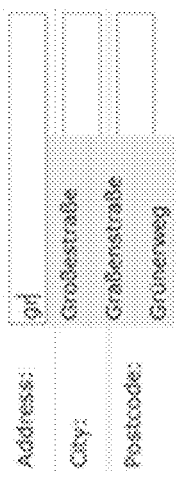

The application 126 displays the candidates to the user (FIG. 4N)

Address=GRIEG

The second difference to point out is that the grouping will be by the street name and not the house numbers that are valid for streets.

Data sent from the application 126 to the cleanse engine 120.

```
{
    country: "DE",
    mixed: "grieg",
    locality: "",
    postcode: "",
    current_field: "mixed"
}
```

The cleanse engine 120 parses the data, identifies that it is too incomplete to validate the address, and therefore sends parsed data to the search engine 128.

```
{
    country: "DE",
        addr_search:
        {
            address.street.primary.name.streetName: "GRIEG",
            current_token: "address.street.primary.name.streetName"
        }
}
```

The search engine 128 queries where country="DE" and streetName begins with "GRIEG". Results are grouped, ordered by count, and the top six are selected to send back to the cleanse engine 120. In this case only two candidates are returned. However, each of these streets may exist in hundreds of cities throughout the country, and each has a different range of valid house numbers.

```
{
    addr_search_results: [2]
    {
        address.street.primary.name.streetName: "GRIEG",
        address.street.primary.name.streetType: "STRAßE"
    },
    {
        address.street.primary.name.streetName: "GRIEGER",
        address.street.primary.name.streetType: "STRAßE"
    }
}
```

The cleanse engine 120 performs basic standardization and sends candidates back to the application 126.

```
{
    std_addr_country_2char: "DE",
    addr_search_status: "0",
        addr_search_results: [2]
            {
                result: "Griegstraße",
                country: "DE",
                    mixed: "Griegstraße",
                locality: "",
                postcode: ""
            },
            {
                result: "Griegerstraße",
                country: "DE",
                    mixed: "Griegerstraße",
                locality: "",
                postcode: ""
            },
}
```

Figure 40:
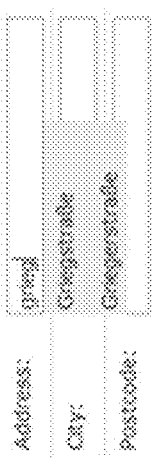

The application 126 displays the candidates to the user (FIG. 40).

The user sees the desired street and selects it. They remain in the Address field and begin to type the house number.
Address=GRIEGSTRAßE 95

The third difference to point out is that a "begins with" search is done on the house number.

Data sent from the application 126 to the cleanse engine 120.

```
{
    country: "DE",
    mixed: "Griegstraße 95",
    locality: "",
    postcode: "",
    current_field: "mixed"
}
```

The cleanse engine 120 parses the data, identifies that it is too incomplete to validate the address, and therefore sends parsed data to the search engine 128.

```
{
    country: "DE",
        addr_search:
            {
                address.street.primary.name.streetName: "GRIEGSTRAßE",
                address.street.primary.number.houseNumber: "95",
                current_token: "address.street.primary.number.houseNumber"
            }
}
```

The search engine 128 queries where country="DE", streetName="GRIEGSTRAßE", and houseNumber begins with "95". Results are grouped, ordered by count, and the top six are selected to send back to the cleanse engine 120.

Note that a "begins with" search is used because the house number is not the first and only component typed at this point.

```
{
    addr_search_results: [6]
        {
            address.street.primary.name.streetName: "GRIEG",
            address.street.primary.name.streetType: "STRAßE",
            address.street.primary.number.houseNumber: "95"
        },
        {
```

```
            address.street.primary.name.streetName: "GRIEG",
            address.street.primacy.name.streetType: "STRAßE",
            address.street.primary.number.houseNumber: "950"
        },
        {
            address.street.primary.name.streetName; "GRIEG",
            address.street.primary.name.streetType: "STRAßE",
            address.street.primary.number.houseNumber: "951"
        },
        ...
}
```

The cleanse engine 120 performs basic standardization and sends candidates back to the application 126.

```
{
    std_addr_country_2char: "DE",
    addr_search_status: "0",
        addr_search_results: [6]
            {
                result: "Griegatraße 95",
                country: "DE",
                    mixed: "Griegstraße 95",
                locality: "",
                postcode: ""
            },
            {
                result: "Griegstraße 950",
                country: "DE",
                    mixed: "Griegstraße 950",
                locality: "",
                postcode: ""
            },
            {
                result: "Griegstraße 951",
                country: "DE",
                    mixed: "Griegstraße 951",
                locality: "",
                postcode: ""
            },
            ...
}
```

Figure 4P:
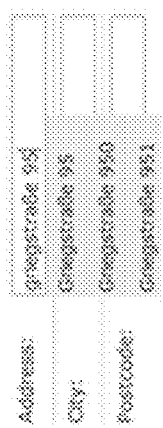

The application 126 displays the candidates to the user (FIG. 4P).

The user sees the desired address and selects it.
City=blank

If the configuration setting is enabled to perform a search in a subsequent field before entering data, as soon as the user enters the City field the application 126 sends the previously selected address data, this time with locality as the current field.

Data sent from the application 126 to the cleanse engine 120.

```
{
    country: "DE",
    mixed: "Griegstraße 95",
    locality: "",
    postcode: "",
    current field: "locality"
}
```

The cleanse engine 120 parses the data, identifies that it is too incomplete to validate the address, and therefore sends parsed data to the search engine 128.

```
    }
    country: "DE",
```

```
addr_search:
    {
        address.street.primary.name.streetName:
"GRIEGSTRAßE",
        address.street.primary.number.houseNumber: "95"
                address.cityRegionPostcode.city: "",
        current_token: "address.cityRegionPostcode.city"
    }
}
```

The search engine 128 queries where country="DE", streetName="GRIEGSTRAßE", and houseNumber="95". Results are grouped, ordered by count, and the top six are selected to send back to the cleanse engine 120.

Note that the house number is used in this search. The search engine 128 only returns a list of cities in which the house number 95 is in the valid range of house numbers for the street Griegstraße.

```
{
    addr_search_results: [6]
        {
            address.cityStateRegion.city: "HAMBURG",
        },
        {
            address.cityStateRegion.city: "MÜNCHEN",
        },
        {
            address.cityStateRegion.city: "STUHR",
        },
        ...
}
```

The cleanse engine 120 performs basic standardization and sends candidates back to the application 126.

```
{
    std_addr_country_2char: "DE",
    addr_search_status: "1",
        addr_search_results: [6]
            {
                result: "Griegstraße 95",
country: "DE",
                        mixed: "Griegstraße 95",
                locality: "Hamburg",
                postcode: ""
            },
            {
                result: "Griegstraße 95",
country: "DE",
                        mixed: "Griegstraße 95",
                locality: "München",
                postcode: ""
            },
            {
                result: "Griegstraße 95",
country: "DE",
                        mixed: "Griegstraße 95",
                locality: "Stuhr",
                postcode: ""
            },
            ...
}
```

Figure 4Q:
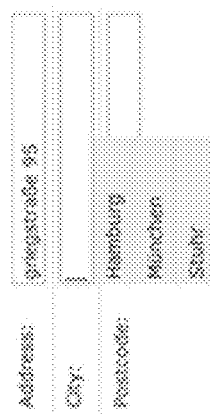

The application 126 displays the candidates to the user (FIG. 4Q).

The user sees the desired city and selects it. Now the application 126 looks at the search status code to see what action to take. Because addr_search_status="1" the application 126 sends another request to finalize the address.

Full Address Match
Data sent from the application 126 to the cleanse engine 120.

```
{
    country: "DE",
    mixed: "Griegetraße 95",
    locality: "Hamburg",
    postcode: "",
    current_field: "locality"
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
    addr_search_status: "2",
    std_addr_country_2char: "DE",
            std_addr_address_delivery: "Griegstraße 95",
            std_addr_locality_full: "Hamburg",
            std_addr_postcode_full: "22763"
}
```

Figure 4R:
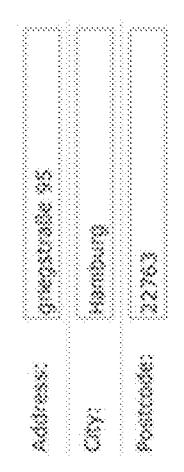

With addr_search_status="2", the application 126 now populates the fields with the validated, corrected data. It may also enable the "Save" button, "Next" button, or whatever the next action is for the end user in the form (FIG. 4R).

Begin With City, Region, Postcode Fields

Figure 4S:
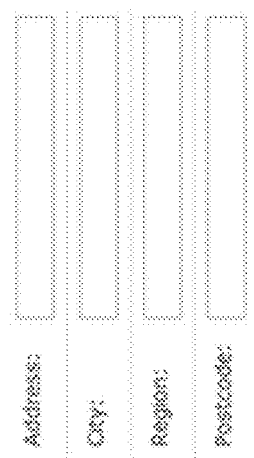

In these scenarios the user is typing into a form with the following schema. The user begins by typing in the City or Postcode fields, planning to complete the Address field after completing the City, Region, and Postcode (FIG. 4S).

Scenario: Search City, then Postcode

Complete address desired by user: 1120 Emerald St, Madison Wis. 53715.

The user begins by typing the first character "M" into the City field.

City=M

Data sent from the application 126 to the cleanse engine 120.

```
{
    country: "US",
    mixed: "",
    locality: "m",
    region: "",
    postcode: "",
    current_field: "locality"
}
```

The cleanse engine 120 parses the data, identifies that it is too incomplete to validate the address, and therefore sends parsed data to the search engine 128.

```
{
    country: "US",
        addr_search:
            {
                address.cityRegionPostcode.city: "M",
    current_token: "address.cityRegionPostcode.city"
            }
}
```

The search engine 128 queries where country="US" and city begins with "M". Results are grouped, ordered by count, and the top six are selected to send back to the cleanse engine 120.

```
{
    addr_search_results: [6]
        {
            address.cityRegionPostcode.city: "MANCHESTER",
            address.cityRegionPostcode.region: "NH"
        },
        {
            address.cityRegionPostcode.city: "MIAMI",
            address.cityRegionPostcode.region: "FL"
        },
        {
            address.cityRegionPostcode.city: "MINNEAPOLIS",
            address.cityRegionPostcode.region: "MN"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "Manchester NH",
                country: "US",
                    mixed: "",
                locality: "Manchester",
                region: "NH",
                postcode: ""
            },
            {
                result: "Miami FL",
                country: "US",
                    mixed: "",
                locality: "Miami",
                region: "FL",
                postcode: ""
            },
            {
                result: "Minneapolis MN",
                country: "US",
                    mixed: "",
                locality: "Minneapolis",
                region: "MN",
                postcode: ""
            },
            ...
}
```

Figure 4T:
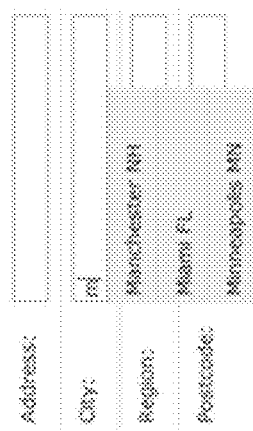

The application 126 displays the candidates to the user. The user may select one of the results from the list, or may ignore the list and keep typing (FIG. 4T).

None of the results displayed is the desired city, and so the user types the next character.

City=Ma

Data sent from the application 126 to the cleanse engine 120.

```
{
    country: "US",
    mixed: "",
    locality: "ma",
    region: "",
    postcode: "",
    current_field: "locality"
}
```

The cleanse engine 120 parses the data, identifies that it is too incomplete to validate the address, and sends parsed data to the search engine 128.

```
{
    country: "US",
        addr_search:
            {
                address.cityRegionPostcode.city: "MA",
            current_token: "address.cityRegionPostcode.city"
            }
}
```

The search engine 128 queries where country="US" and city begins with "MA". Results are grouped, ordered by count, and the top six are selected to send back to the cleanse engine 120.

```
{
    addr_search_results: [6]
        {
            address.cityRegionPostcode.city: "MANCHESTER",
            address.cityRegionPostcode.region: "NH"
        },
        {
            address.cityRegionPostcode.city: "MANKATO",
            address.cityRegionPostcode.region: "MN"
        },
        {
            address.cityRegionPostcode.city: "MANSFIELD",
            address.cityRegionPostcode.region: "TX"
        },
        ...
}
```

The cleanse engine 120 performs basic standardization and sends candidates back to the application 126.

```
{
    std_addr_country_2char: "US",
    addr_search_status: "0",
        addr_search_results: [6]
            {
                result: "Manchester NH",
                country: "US",
                    mixed.: "",
                locality: "Manchester",
                region: "NH",
                postcode: ""
            },
            {
                result: "Mankato MN",
                country: "US",
                    mixed: "",
                locality: "Mankato",
                region: "MN",
                postcode: ""
            },
            {
                result: "Mansfield",
                country: "TX",
                    mixed: "",
                locality: "Mansfield",
                region: "TX",
                postcode: ""
            },
            ...
}
```

Figure 4U:
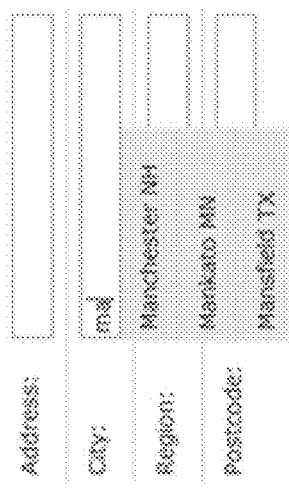

The application 126 displays the candidates to the user (FIG. 4U).

The user still does not see the desired city and therefore continues to type.

City=Madiso

The process continues with each character entered by the user. Now skip to where the user enters almost the entire city. It is common for this to happen when there are many cities beginning with those characters in the country.

Data sent from the application 126 to the cleanse engine 120.

```
{
    country: "US",
    mixed: "",
    locality: "madiso",
    region: "",
    postcode: "",
    current_field: "locality"
}
```

The cleanse engine 120 parses the data, identifies that it is too incomplete to validate the address, and sends parsed data to the search engine 128.

```
{
    country: "US",
    addr_search:
        {
            address.cityRegionPostcode.city: "MADISO",
            current_token: "address.cityRegionPostcode.city"
        }
}
```

The search engine 128 queries where country="US" and city begins with "MADISO". Results are grouped, ordered by count, and the top six are selected to send back to the cleanse engine 120.

```
{
    addr_search_results: [6]
    {
        address.cityRegionPostcode.city: "MADISON",
        address.cityRegionPostcode.region: "CA"
    },
    {
        address.cityRegionPostcode.city: "MADISON",
        address.cityRegionPostcode.region: "VA"
    },
    {
        address.cityRegionPostcode.city: "MADISON",
        address.cityRegionPostcode.region: "WI"
    },
    ...
}
```

The cleanse engine 120 performs basic standardization and sends candidates back to the application 126.

```
{
    std_addr_country_2char: "US",
    addr_search_status: "0",
        addr_search_results: [6]
        {
            result: "Madison CA",
            country: "US",
                mixed: "",
            locality: "Madison",
            region: "CA",
            postcode: ""
        },
        {
            result: "Madison VA",
            country: "US",
```

-continued

```
                mixed: "",
            locality: "Madison",
            region: "VA",
            postcode: ""
        },
        {
            result: "Madison WI",
            country: "US",
                mixed: ""
            locality: "Madison",
            region: "WI",
            postcode: ""
        },
        ...
}
```

Figure 4V:
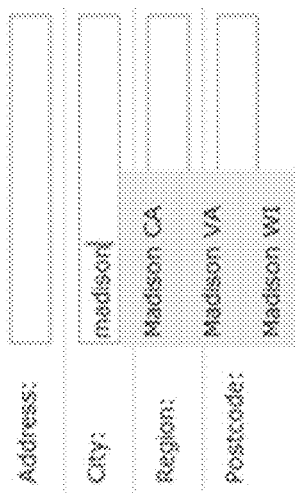

The application 126 displays the candidates to the user (FIG. 4V).

Figure 4W:
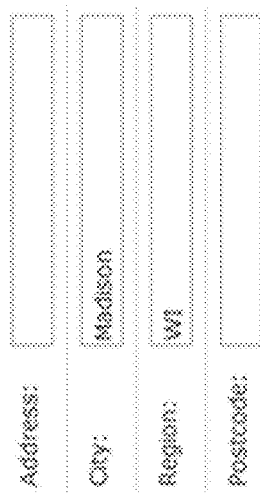

The user sees the desired city and selects it from the list. Now the application 126 looks at the search status code to see what action to take. Because addr_search_status="0" the application 126 overwrites fields with the non-display attributes, in this case locality and region, and waits for more user action (FIG. 4W).

Now the user enters the Postcode field.

Postcode=blank

If the configuration setting is enabled to perform a search in a subsequent field before entering data, as soon as the user enters the Postcode field the application 126 sends the data so far, this time with postcode as the current field.

Data sent from the application 126 to the cleanse engine 120.

```
{
    country: "US",
    mixed: ""
    locality: "madison",
    region: "wi",
    postcode: "",
    current_field: "postcode"
}
```

The cleanse engine 120 parses the data, identifies that it can generate the list of postcodes for the city, and therefore does not send anything to the search engine 128.

The cleanse engine 120 sends candidates back to the application 126.

```
{
    std_addr_country_2char: "US",
    addr_search_status: "0",
        addr_search_results: [6]
        {
            result: "53706",
            country: "US",
                mixed: "",
            locality: "Madison",
            region: "WI",
            postcode: "53706"
        },
        {
            result: "53715",
            country: "US",
                mixed: "",
            locality: "Madison",
            region: "WI",
            postcode: "53715"
        },
        {
            result: "53716",
```

-continued

```
        country: "US",
              mixed: "",
        locality: "Madison",
        region: "WI",
        postcode: "53716"
            },
            ...
    }
```

Figure 4X:
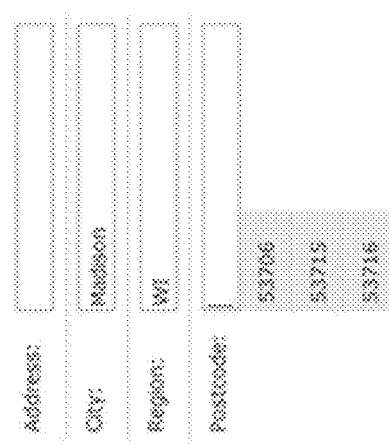

The application 126 displays the candidates to the user (FIG. 4X).

Figure 4Y:
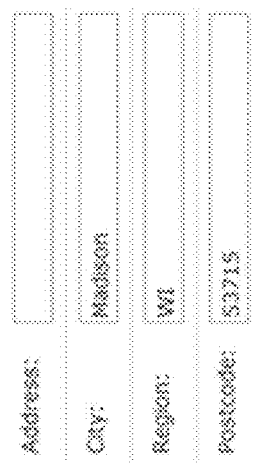

The user sees the desired postcode and selects it from the list. Now the application 126 looks at the search status code to see what action to take. Because addr_search_status="0" the application 126 overwrites fields with the non-display attributes, in this case locality, region, and postcode, and waits for more user action (FIG. 4Y).

Now the user enters the Address field. The process now follows similar to the base scenario in the "United States street address" scenario, with two differences to mention. One difference is that the data entered so far is sent with the ranked parses, and the search engine 128 uses the data to return a list of candidates within the city, region, and postcode.

Address=1

The user begins to enter "1" in the Address field. Data sent from the application 126 to the cleanse engine 120.

```
            {
        country: "US",
        mixed: "1",
        locality: "Madison",
        region: "WI",
        postcode: "53715",
        current_field: "mixed"
            }
```

The cleanse engine 120 parses the data, identifies that it is too incomplete to validate the address, and therefore sends parsed data to the search engine 128. For the first two characters only the single parse of house number is sent.

```
        {
    country: "US",
        addr_search:
            {
            address.street.primary.number.houseNumber: "1",
            address.cityRegionPostcode.city: "MADISON",
            address.cityRegionPostoode.region: "WI",
            address.cityRegionPostcode.postcode: "53715",
        current_token: "address.street.primary.number.houseNumber "
            }
        }
```

The search engine 128 queries where country="US", city="MADISON", region="WI", postcode="53715", and houseNumber="1". Note that the search results are refined to be within the known city, region, and postcode, instead of being broadly within the whole country. Also note that an "equals" search is done on the house number until part of the street name is known.

Address=1120 Euler

The second difference occurs because the cleanse engine 120 always first attempts to make a full address match before sending partial data to the search engine 128. Because the city, region, and postcode are already provided, at some point enough key strokes are provided in the address that a match can be confidently made to a single address.

Say this happens after the user types "1120 emer".

Data sent from the application 126 to the cleanse engine 120.

```
            {
        country: "US",
        mixed: "1120 emer",
        locality: "Madison",
        region: "WI",
        postcode: "53715",
        current_field: "mixed"
            }
```

The cleanse engine 120 parses the data, identifies that it can confidently match the partial address with a single address in the reference data, and therefore does not send anything to the search engine 128.

The cleanse engine 120 sends the candidate back to the application 126. Note that the addr_search_status="1", indicating that this is an address that can be finalized if the user selects it.

```
            {
    std_addr_country_2char: "US",
    addr_search_status: "1",
        addr_search_results: [1]
            {
            result: "1120 Emerald St",
        country: "US",
            mixed: "1120 Emerald St",
        locality: "Madison",
        region: "WI",
        postcode: "53715"
            }
        }
```

Figure 4Z:
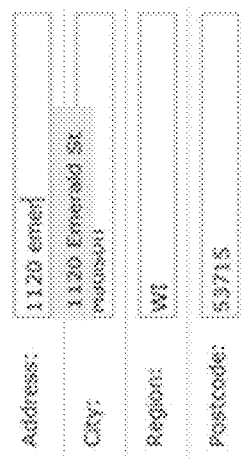

The application 126 displays the candidate to the user (FIG. 4Z).

The user sees the desired address and selects it. Now the application 126 looks at the search status code to see what action to take. Because addr_search_status="1" the application 126 sends another request to finalize the address.

Full Address Match

Data sent from the application 126 to the cleanse engine 120.

```
            {
        country: "US",
        mixed: "1120 Emerald St",
        locality: "Madison",
        region: "WI",
        postcode: "53715",
        current_field: "mixed"
            }
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
            {
        addr_search_status: "2",
        std_addr_country_2char: "US",
```

```
            std_addr_address_delivery: "1120 Emerald St",
            std_addr_locality_full: "Madison",
            std_addr_region_full: "WI",
            std_adds_postcode_full: "53715-0692"
        }
```

With addr_search_status="2", the application 126 now populates the fields with the validated, corrected data (FIG. 5A).
Scenario: Search Postcode, then City
Complete address desired by user: 526 Cherry Rd, Rock Hill S.C. 29732.
The user begins by typing the first digit "2" into the Postcode field.
Postcode=2
Data sent from the application 126 to the cleanse engine 120.

```
                {
                    country: "US",
                    mixed: "",
                    locality: "",
                    region: "",
                    postcode: "2",
                    current_field: "postcode"
                }
```

The cleanse engine 120 parses the data, identifies that it is too incomplete to validate the address, and therefore sends parsed data to the search engine 128.

```
                {
                    country: "US",
                        addr_search:
                        {
                            address.cityRegionPostcode.postcode: "2",
                            current_token: "address.cityRegionPostcode.postcode"
                        }
                }
```

The search engine 128 queries where country="US" and postcode begins with "2". The top six results are selected to send back to the cleanse engine 120.

```
                {
                    addr_search_results: [6]
                    {
                        address.cityRegionPostcode.postcode: "20001"
                    },
                    {
                        address.cityRegionPostcode.postcode: "20002"
                    },
                    {
                        address.cityRegionPostcode.postcode: "20003"
                    },
                    ...
                }
```

The cleanse engine 120 performs basic standardization and sends candidates back to the application 126.

```
                {
                    std_addr_country_2char: "US",
                    addr_search_status: "0",
                        addr_search_results: [6]
                        {
```

```
                            result: "20001",
                            country: "US",
                                mixed: "",
                            locality: "",
                            region: "",
                            postcode: "20001"
                        },
                        {
                            result: "20002",
                            country: "US",
                                mixed: "",
                            locality: "",
                            region: "",
                            postcode: "20002"
                        },
                        {
                            result: "20003",
                            country: "US",
                                mixed: "",
                            locality: "",
                            region: "",
                            postcode: "20003"
                        },
                        ...
                }
```

Figure 5B:
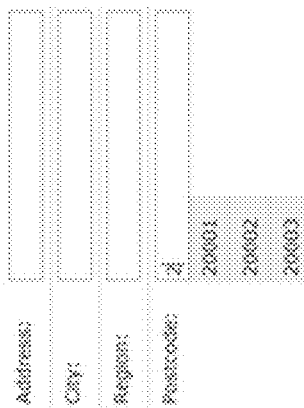

The application 126 displays the candidates to the user. The user may select one of the results from the list, or may ignore the list and keep typing (FIG. 5B).
None of the results displayed is the desired postcode, and so the user types the next digit.
The process continues until the user types the fourth digit. At this point the candidate list is small enough to be applicable to the user.
Postcode=2973
Data sent from the application 126 to the cleanse engine 120.

```
                {
                    country: "US",
                    mixed: "",
                    locality: "",
                    region: "",
                    postcode: "2973",
                    current_field: "postcode"
                }
```

The cleanse engine 120 parses the data, identifies that it is too incomplete to validate the address, and therefore sends parsed data to the search engine 128.

```
                {
                    country: "US",
                        addr_search:
                        {
                            address.cityRegionPostcode.postcode: "2973",
                            current_token: "address.cityRegionPostcode.postcode"
                        }
                }
```

The search engine 128 queries where country="US" and postcode begins with "2973". This time there are only five results to send back to the cleanse engine 120, and because of the small number of results it includes the city and region.

```
                {
                    addr_search_results: [5]
                    {
```

```
        address.cityRegionPostcode.city: "ROCK HILL",
        address.cityRegionPostcode.region: "SC",
        address.cityRegionPostcode.postcode: "29731"
    },
    {
        address.cityRegionPostcode.city: "ROCK HILL",
        address.cityRegionPostcode.region: "SC",
        address.cityRegionPostcode.postcode: "29732"
    },
    {
        address.cityRegionPostcode.city: "ROCK HILL",
        address.cityRegionPostcode.region: "SC",
        address.cityRegionPostcode.postcode: "29733"
    },
    ...
}
```

The cleanse engine 120 performs basic standardization and sends candidates back to the application 126.

```
{
    std_addr_country_2char: "US",
    addr_search_status: "0",
        addr_search_results: [5]
        {
            result: "Rock Hill SC 29731",
            country: "US",
                mixed: "",
            locality: "Rock Hill",
            region: "SC",
            postcode: "29731"
        },
        {
            result: "Rock Hill SC 29732",
            country: "US",
                mixed: "",
            locality: "Rock Hill",
            region: "SC",
            postcode: "29732"
        },
        {
            result: "Rock Hill SC 29733",
            country: "US",
                mixed: "",
            locality: "Rock Hill",
            region: "SC",
            postcode: "29733"
        },
        ...
}
```

Figure 5C:
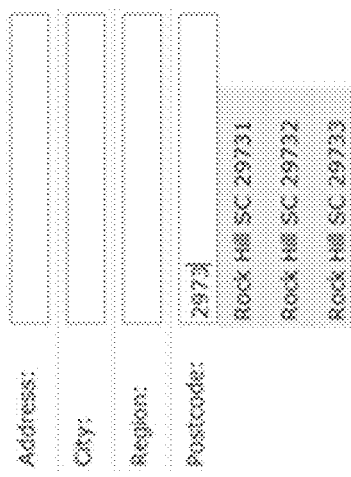

The application 126 displays the candidates to the user (FIG. 5C).

Figure 5D:
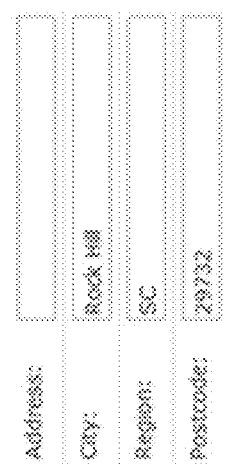

The user sees the desired postcode and selects it from the list. Now the application 126 looks at the search status code to see what action to take. Because addr_search_status="0" the application 126 overwrites fields with the non-display attributes, in this case city, region, and postcode, and waits for more user action (FIG. 5D).

Now the user enters the Address field. The process now follows the same as the "Search city, then postcode" scenario.

Address 526 S CHE

Because the city, region, and postcode are already provided, at some point enough key strokes are provided in the address that a match can be confidently made to a single address.

Say this happens after the user types "526 s the".

Data sent from the application 126 to the cleanse engine 120.

```
{
    country: "US",
    mixed: "526 s che",
    locality: "Rock Hill",
    region: "SC",
    postcode: "29732",
    current_field: "mixed"
}
```

The cleanse engine 120 parses the data, identifies that it can confidently match the partial address with a single address in the reference data, and therefore does not send anything to the search engine 128.

The cleanse engine 120 sends the candidate back to the application 126. Note that the addr_search_status="1", indicating that this is an address that can be finalized if the user selects it.

```
{
    std_addr_country_2char: "US",
    addr_search_status: "1",
        addr_search_results: [1]
        {
            result: "526 S Cherry Rd",
            country: "US",
                mixed: "526 S Cherry Rd",
            locality: "Rock Hill",
            region: "SC",
            postcode: "29732"
        }
}
```

Figure 5E:
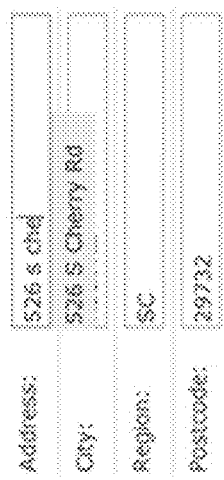

The application 126 displays the candidate to the user (FIG. 5E).

The user sees the desired address and selects it. Now the application 126 looks at the search status code to see what action to take. Because addr_search_status="1" the application 126 sends another request to finalize the address.

Full Address Match

Data sent from the application 126 to the cleanse engine 120.

```
{
    country: "US",
    mixed: "526 S Cherry Rd",
    locality: "Rock Hill",
    region: "SC",
    postcode: "29732",
    current_field: "mixed"
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
    addr_search_status: "2",
    std_addr_country_2char: "US",
        std_addr_address_delivery: "526 S Cherry Rd",
        std_addr_locality_full: "Rock Hill",
        std_addr_region_full: "SC",
        std_addr_postcode_full: "29732-4409"
}
```

With addr_search_status="2", the application 126 now populates the fields with the validated, corrected data (FIG. 5F).

Scenario (Variation): Unique Postcode

Complete address in the United Kingdom desired by user: Hatfield House, 13 Danbury St, London N1 8LD.

This scenario is the same as the "Search postcode, then city" scenario, but the difference is that when the user selects a postcode from the candidate list there is only one address for that postcode. Therefore, the cleanse engine 120 returns a full address instead of using the search engine 128.

Example

Figure 5G:
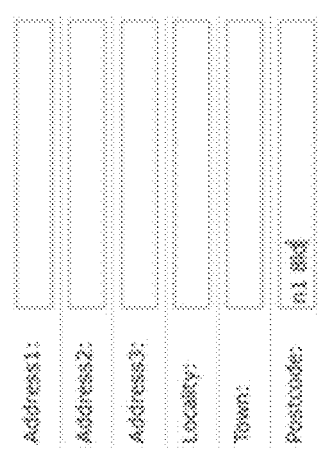

The user begins by typing into the Postcode field. The process for searching for partial postcode data occurs and candidate lists are provided to the user with each keystroke, but in this scenario the user types the full postcode (FIG. 5G).

Data sent from the application 126 to the cleanse engine 120.

```
{
country: "GB",
mixed: "",
mixed2: "",
mixed3: "",
locality: "",
locality2: "",
postcode: "n1 8ld",
current_field: "postcode"
}
```

The cleanse engine 120 parses the data, identifies that it can confidently match the postcode with a single address in the reference data, and therefore does not send anything to the search engine 128.

The cleanse engine 120 sends the candidate back to the application 126. Note that the addr_search_status="1", indicating that this is an address that can be finalized if the user selects it.

```
{
std_addr_country_2char: "GB",
    addr_search_status: "1",
        addr_search_results: [1]
        {
            result: "Hatfield House, 13 Danbury St, London N1 8LD",
            country: "GB",
                mixed: "Hatfield House",
            mixed2: "13 Danbury St",
                mixed3: "",
            locality: "London",
            locality2: "",
            postcode: "N1 8LD"
        }
}
```

Figure 5H:
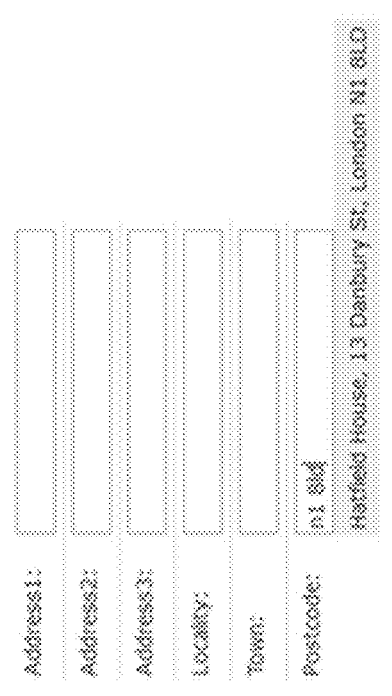

The application 126 displays the candidate to the user (FIG. 5H).

The user sees the desired address and selects it. Now the application 126 looks at the search status code to see what action to take. Because addr_search_status="1" the application 126 sends another request to finalize the address.

Data sent from the application 126 to the cleanse engine 120.

```
{
country: "GB",
mixed: "Hatfield House",
mixed2: "13 Danbury St",
mixed3: "",
locality: "London",
locality2: "",
postcode: "N1 8LD",
}
```

The cleanse engine 120 parses the data, and this time identifies that the address is complete enough to validate. It performs its normal address cleansing process (without sending anything to the search engine 128) and returns a fully cleansed address to the application 126. The attributes returned are the attributes selected in the request.

```
{
addr_search_status: "2",
std_addr_country_2char: "GB",
        std_addr_building_name: "Hatfield House",
        std_addr_address_delivery: "13 Danbury St",
        std_addr_locality3_full: "",
        std_addr_locality2_full: "",
        std_addr_locality_full: "London",
        std_addr_postcode_full: "N1 8LD"
}
```

With addr_search_status="2", the application 126 now populates the fields with the validated, corrected data (FIG. 5I).

Referring back to FIG. 1, the global address cleanse system 100 also has access to enterprise software application 106. The enterprise software application 106 represents computer software used to satisfy the needs of a business organization. Enterprise software application 106 generally includes a collection of computer programs (i.e., software applications and repositories) with common business applications, tools for modeling how an organization functions, and development tools for building applications unique to the organization. The enterprise software application 106 can be used in combination with server 108 to improve enterprise productivity and efficiency by providing data quality configuration generation and usage.

Services provided by the enterprise software application 106 may include business-oriented tools such as data model configuration management and data quality cleansing and management. Other services are possible including, but not limited to online shopping and online payment processing, interactive product management, automated billing systems, security, enterprise content management, IT service management, customer relationship management, enterprise resource planning, business intelligence, project management, collaboration, human resource management, manufacturing, enterprise application integration, and enterprise forms automation.

The global address cleanse system 100 can be communicatively coupled to source 104. Source 104 can access the global address cleanse system 100 and any associated software applications. Source 104 can be connected (wired or wirelessly) to the global address cleanse system 100, which can provide business data, user interfaces, and other data for use and display.

At least some of the communications between the client 104 and the global address cleanse system 100 may be performed across or via network 110 (e.g., the Internet). In some implementations, system 100 may represent an example configuration of a system for establishing networks using networked applications built on a shared platform in a cloud computing environment. The source 104 and/or the global address cleanse system 100 may be configured with development technology and hosted and managed services and applications built on top of an underlying platform technology. In one non-limiting example, the term "platform technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "platform technology" is understood as an Enterprise Resource Planning (ERP) technology or in-memory database such as High Performance Analytic Appliance (HANA) platform.

In some implementations, any number of content servers and one or more computer-readable storage devices can communicate with the source 104 and global address cleanse system 100 using network 110 to provide data content to client devices associated with system 100. In some implementations, the network 110 can be a public communications network (e.g., the Internet, cellular data network, dialup modems over a telephone network) or a private communications network (e.g., private LAN, leased lines). In some implementations, the source 104 and/or global address cleanse system 100 can communicate with the network 110 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for performing search and cleanse of address data, the method comprising:
   receiving, at a cleanse engine, address data from an application as the address data is entered into the application, the cleanse engine comprising at least one processor and at least one memory including instructions which when executed by the at least one processor causes the operations attributed to the cleanse engine;
   parsing, by the cleanse engine, the address data as the data is received from the application, the as the data is received comprising a keystroke by keystroke entry into the application, such that the receiving and the parsing are performed on a per keystroke basis;
   performing, by the cleanse engine, an action responsive to the address data parsed on a per keystroke basis, wherein
   the action includes performing a final address validation to validate a final address when sufficient parsed address data is available to validate and returning the final address to the application, and
   the action includes sending the parsed address data to a search engine when insufficient parsed address data is available to perform the final address validation;
   when the parsed address data is sent to the search engine, querying reference data by the search engine and returning a list of search results to the cleanse engine;

standardizing, by the cleanse engine, the list of search results from the search engine, the standardizing based on the country code associated with the address data; and sending, by the cleanse engine, the list of search results to the application, the list of search results standardized and sent to the application along with an error message associated with at least one component of an address, the error message indicating an out of range house number.

2. The method as in claim 1 wherein the list of search results sent to the application includes display data for displaying by the application and non-display data, the method further comprising:

receiving, by the cleanse engine, a selection from the list of search results from the application including the non-display data associated with the selection;

performing, by the cleanse engine, the final address validation on the non-display data associated with the selection; and returning the final address to the application.

3. The method as in claim 1 wherein receiving the address data from the application comprises receiving a schema of fields exposed by the application, a country code, the address data and an identification of a current field associated with the address data.

4. The method as in claim 1 wherein:

the address data comprises first address data entered into a first address field and second address data entered into a second address field; and querying the reference data comprises querying the reference data using the first address data and the second address data.

5. The method as in claim 1 wherein:

the address data is associated with a country code.

6. The method as in claim 1 wherein sending the list of search results to the application comprises sending the list of search results to the application including additional suggested address data.

7. The method as in claim 1 wherein sending the list of search results to the application comprises sending the list of search results to the application including a search status attribute field that defines one or more possible actions for the application to perform.

8. A system for performing search and cleanse of address data, the system comprising:

at least one memory including instructions on a computing device; and at least one processor on the computing device, wherein the processor is operably coupled to the at least one memory and is arranged and configured to execute the instructions that, when executed, cause the processor to implement a cleanse engine and a search engine, wherein:

the cleanse engine is configured to at least:

receive address data from an application as the address data is entered into the application, parse the address data as the data is received from the application, the as the data is received comprising a keystroke by keystroke entry into the application, such that the receive and the parse are performed on a per keystroke basis;

perform an action responsive to the parsed address data, wherein the action includes performing a final address validation to validate a final address when sufficient parsed address data is available to validate and returning the final address to the application, and the action includes sending the parsed address data to a search engine when insufficient parsed address data is available to perform the final address validation;

the search engine is configured to query reference data when the parsed address data is sent to the search engine and to return a list of search results to the cleanse engine; and the cleanse engine is configured to standardize the list of search results from the search engine, the standardization based on the country code associated with the address data and send the list of search results to the application, the list of search results standardized and sent to the application along with an error message associated with at least one component of an address, the error message indicating an out of range house number.

9. The system of claim 8 wherein:

the list of search results sent to the application includes display data for displaying by the application and non-display data; and the cleanse engine is further configured to:

receive a selection from the list of search results from the application including the non-display data associated with the selection, perform the final address validation on the non-display data associated with the selection, and return the final address to the application.

10. The system of claim 8 wherein the address data received from the application comprises a schema of fields exposed by the application, a country code, the address data and an identification of a current field associated with the address data.

11. The system of claim 8 wherein:

the address data comprises first address data entered into a first address field and second address data entered into a second address field; and the search engine is configured to query the reference data using the first address data and the second address data.

12. The system of claim 10 wherein the cleanse engine is configured to send the list of search results to the application including additional suggested address data.

13. The system of claim 8 wherein the cleanse engine if configured to send the list of search results to the application including a search status attribute field that defines one or more possible actions for the application to perform.

14. A computer program product for performing search and cleanse of address data, the computer program product being tangibly embodied on a non-transitory computer-readable storage medium and comprising instructions that, when executed, are configured to cause at least one computing device to provide a cleanse engine, the cleanse engine configured to at least:

receive address data from an application as the address data is entered into the application, parse the address data as the data is received from the application, the as the data is received comprising a keystroke by keystroke entry into the application, such that the receive and the parse are performed on a per keystroke basis;

perform an action responsive to the parsed address data, wherein the action includes performing a final address validation to validate a final address when sufficient parsed address data is available to validate and returning the final address to the application, and the action includes sending the parsed address data to a search engine when insufficient parsed address data is available to perform the final address validation;

the search engine is configured to query reference data when the parsed address data is sent to the search engine and to return a list of search results to the cleanse engine; and the cleanse engine is configured to standardize the list of search results from the search engine, the standardization based on the country code associated with the address data and send the list of search results to the application, the list of search results standardized and sent to the application along with an error message associated with at least one component of an address, the error message indicating an out of range house number.

15. The computer program product of claim 14 wherein the list of search results sent to the application includes display data for displaying by the application and non-display data and further comprising instructions that, when executed, are configured to cause at least one computing device to:

receive, by the cleanse engine, a selection from the list of search results from the application including the non-display data associated with the selection;

perform, by the cleanse engine, the final address validation on the non-display data associated with the selection; and return the final address to the application.

\* \* \* \* \*